US010939512B2

(12) United States Patent
Sadahira et al.

(10) Patent No.: US 10,939,512 B2
(45) Date of Patent: Mar. 2, 2021

(54) MICROWAVE HEATING APPARATUS

(71) Applicant: Panasonic Intellectual Property Management Co., Ltd., Osaka (JP)

(72) Inventors: Masafumi Sadahira, Shiga (JP); Koji Yoshino, Shiga (JP); Masayuki Kubo, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 246 days.

(21) Appl. No.: 16/081,039

(22) PCT Filed: Mar. 23, 2017

(86) PCT No.: PCT/JP2017/011665
§ 371 (c)(1),
(2) Date: Aug. 30, 2018

(87) PCT Pub. No.: WO2017/164291
PCT Pub. Date: Sep. 28, 2017

(65) Prior Publication Data
US 2019/0090317 A1    Mar. 21, 2019

(30) Foreign Application Priority Data

Mar. 25, 2016    (JP) .............................. JP2016-061036

(51) Int. Cl.
*H05B 6/50*        (2006.01)
*H05B 6/68*        (2006.01)
(Continued)

(52) U.S. Cl.
CPC ............... *H05B 6/68* (2013.01); *H05B 6/705* (2013.01); *H05B 6/72* (2013.01); *H05B 6/725* (2013.01); *Y02B 40/00* (2013.01)

(58) Field of Classification Search
CPC .......... H05B 6/68; H05B 6/681; H05B 6/685; H05B 6/687; H05B 6/688; H05B 6/702;
(Continued)

(56) References Cited

U.S. PATENT DOCUMENTS 4,777,336 A    10/1988 Asmussen
5,347,108 A *  9/1994 Minakawa ........... H05B 6/6464
                                                    219/696
(Continued)

FOREIGN PATENT DOCUMENTS

JP    55-044199    3/1980
JP    55-056396    4/1980
(Continued)

OTHER PUBLICATIONS

International Search Report of PCT application No. PCT/JP2017/011665 dated May 16, 2017.
(Continued)

*Primary Examiner* — Hung D Nguyen
(74) *Attorney, Agent, or Firm* — Wenderoth, Lind & Ponack, L.L.P.

(57) ABSTRACT

The present invention includes a directional coupler that detects at least part of a reflected wave inside a waveguide. When an object to be heated is absent, a reflected wave is strong, because there is nothing to absorb a microwave. When the object is present, the reflected wave is weak, because the microwave is absorbed by the object. As a quantity of the object becomes greater, a larger amount of microwave is absorbed by the object, and thus the reflected wave is weakened. It is thus possible to determine the quantity of the object from a reflected wave detection amount detected by the directional coupler without using a detector that detects a load.

5 Claims, 10 Drawing Sheets

(51) Int. Cl.
*H05B 6/70* (2006.01)
*H05B 6/72* (2006.01)

(58) Field of Classification Search
CPC ........ H05B 6/704; H05B 6/705; H05B 6/708;
H05B 6/72; H05B 6/725; H05B 6/80;
H05B 6/806; Y02B 40/143
USPC ....... 219/690–697, 704, 705, 708, 709, 715,
219/716, 745–750, 756
See application file for complete search history.

(56) References Cited

U.S. PATENT DOCUMENTS

| | | | | |
|---|---|---|---|---|
| 6,166,363 A | * | 12/2000 | Shon | ...................... H05B 6/687 |
| | | | | 219/704 |
| 6,469,286 B1 | * | 10/2002 | Nobue | ................... H05B 6/705 |
| | | | | 219/746 |
| 2010/0155392 A1 | * | 6/2010 | Nordh | ...................... H05B 6/68 |
| | | | | 219/702 |
| 2015/0244055 A1 | | 8/2015 | Yoshino et al. | |

FOREIGN PATENT DOCUMENTS

| | | |
|---|---|---|
| JP | 4-245191 | 9/1992 |
| JP | 2014-234932 | 12/2014 |
| WO | 2014/119333 | 8/2014 |

OTHER PUBLICATIONS

Extended European Search Report dated Mar. 19, 2019 in related European Patent Application No. 17770331.1.

* cited by examiner

MICROWAVE HEATING APPARATUS

This application is a U.S. national stage application of the PCT International Application No. PCT/JP2017/011665 filed on Mar. 23, 2017, which claims the benefit of foreign priority of Japanese patent application No. 2016-061036 filed on Mar. 25, 2016, the contents all of which are incorporated herein by reference.

TECHNICAL FIELD

The present invention relates to a microwave heating apparatus that subjects an object to heating with a microwave and that detects part of the microwave propagating inside a waveguide and controls the heating.

BACKGROUND ART

Microwave ovens are a conventionally known, representative example of microwave heating apparatuses. A typical microwave oven has a magnetron as a microwave generator. In this microwave oven, the magnetron radiates a microwave, which then passes through a waveguide and reaches a heating chamber. This microwave heats an object (food) placed inside the heating chamber.

Such microwave ovens need to heat an object as evenly as possible so as to suppress uneven heating of the object. Therefore, some contemporary microwave ovens employ a turntable type and a rotating antenna type, for example. In the turntable type, an object to be heated itself rotates; in the rotating antenna type, a rotatable antenna is disposed in a part that radiates a microwave to within a heating chamber via a waveguide.

Two kinds of microwaves (incident or progressive wave and reflected wave) are present within the waveguide in a microwave oven. The incident or progressive wave propagates in the direction from the magnetron to the heating chamber, whereas the reflected wave is not absorbed in the object and thus propagates in the direction from the heating chamber to the magnetron. This reflected wave changes, depending on a shape, material, location, and other properties of the object to be heated. Also, the reflected wave changes, depending on directions in which the above turntable and antenna face. To heat an object evenly, thus, it is necessary to grasp changes in the incident and reflected waves.

In one method of monitoring incident and reflected waves inside a waveguide, a directional coupler is used. This directional coupler has a function of separating an incident and reflected waves present inside a waveguide from each other. In addition, directional coupler needs to attenuate a microwave to some extent (for example, by 30 dB) in order to suppress its presence from affecting the propagation of the microwaves inside the wave guide. For that purpose, the directional coupler inevitably has a considerably large size. Therefore, many microwave ovens intended for ordinary households have not been equipped with such large-sized directional couplers.

However, small-sized directional couplers have been recently developed (for example, refer to PTL 1). Those small-sized directional couplers are expected to be used in microwave ovens.

On the other hand, there are some microwave ovens that automatically do cooking. Those microwave ovens determine a quantity of an object to be heated and control a cooking time so that it extends in proportional to the quantity (for example, refer to PTL 2). A microwave oven disclosed in PTL 2 is equipped with a weight detector. This weight detector detects a weight of a table plate when a tray on which an object to be heated is mounted is placed on the table plate.

When the tray on which the object is mounted is placed on the table plate, if a load is insufficiently applied to the table plate, the microwave heating apparatus disclosed in PTL 2 may fail to accurately measure the weight of the table plate. For example, if the tray is placed on a shelf formed on a wall surface of a heating chamber, a load of the tray is applied to the shelf. The load is not applied to the table plate. Thus, the microwave heating apparatus may fail to measure the weight accurately.

CITATION LIST

Patent Literature

PTL 1: WO 2014/119333
PTL 2: Unexamined Japanese Patent Publication No. 2014-234932

SUMMARY OF THE INVENTION

The present invention provides a microwave heating apparatus that determines a quantity of an object to be heated by detecting a reflected wave inside a wave guide instead of detecting a load with a detector and then controls heating.

A microwave heating apparatus of the present invention includes: a heating chamber that accommodates an object to be heated; a microwave generator that generates a microwave to be supplied to the heating chamber; and a waveguide through which the microwave generated by the microwave generator propagates to the heating chamber. Furthermore, the microwave heating apparatus includes: a reflected wave detector that detects at least part of a reflected wave inside the wave guide; a quantity determiner that determines a quantity of the object from a reflected wave detection amount that is an amount of the at least part of the reflected wave detected by the reflected wave detector; and a controller that controls the microwave generator based on the quantity determined by the quantity determiner.

According to this configuration, the microwave heating apparatus is provided with the reflected wave detector that detects the at least part of the reflected wave inside the waveguide. When the object is absent, the reflected wave is strong, because there is nothing to absorb the microwave. When the object is present, the reflected wave is weak, because the microwave is absorbed by the object. As the quantity of the object becomes greater, a larger amount of microwave is absorbed by the object, and thus the reflected wave is weakened. In short, the quantity determiner detects a load, based on the reflected wave detection amount detected by the reflected wave detector. This enables the microwave heating apparatus to determine the quantity of the object to be heated without using a detector that detects a load. Consequently, it is possible to heat the object efficiently, based on the determined quantity.

DESCRIPTION OF EMBODIMENTS

Some exemplary embodiments of the present invention will be described below with reference to the accompanying drawings. It should be noted that those exemplary embodiments are not intended to limit the present invention.

First Exemplary Embodiment

Figure 1:
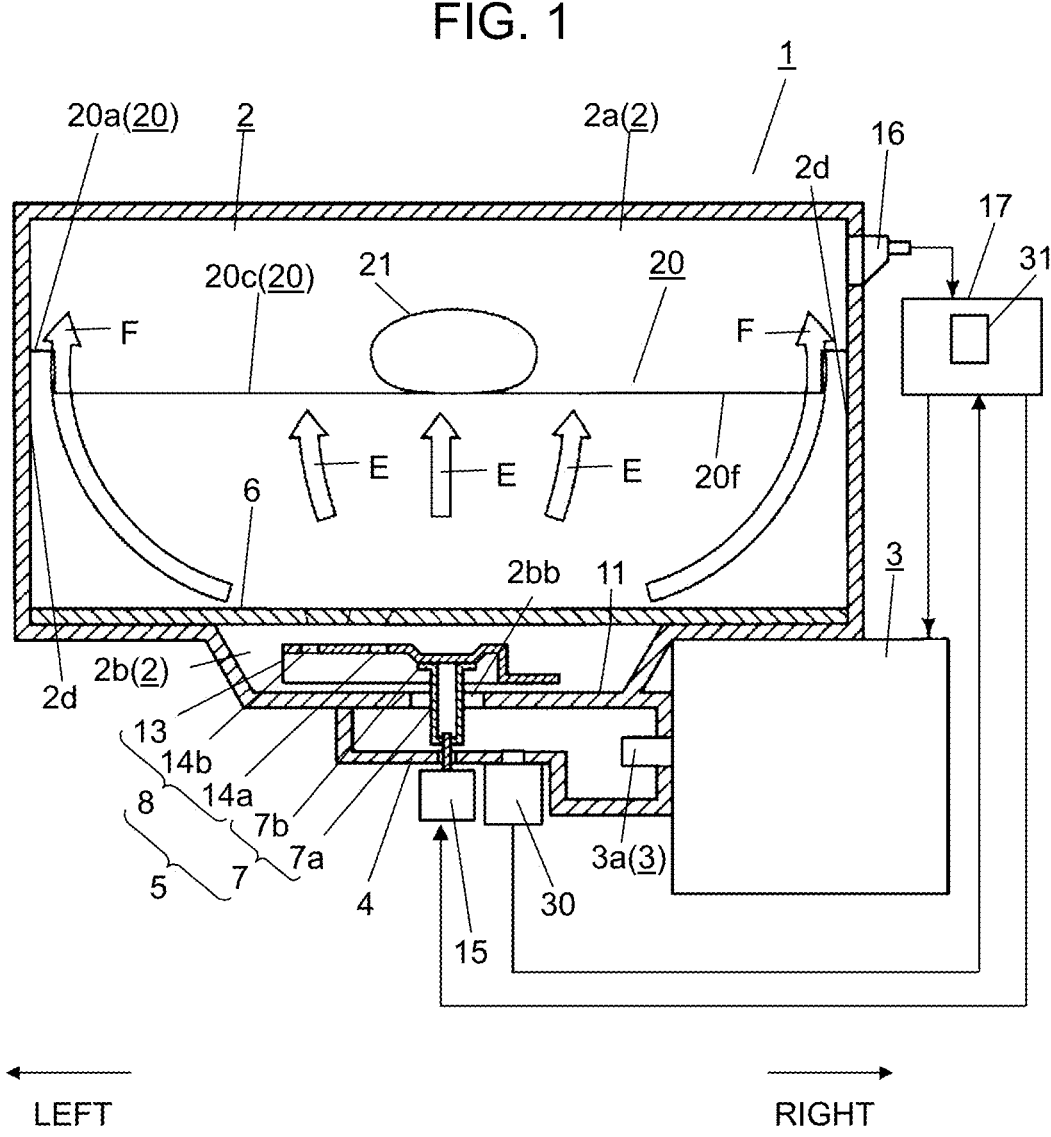
FIG. 1 is a sectional view of a schematic configuration of a microwave heating apparatus according to a first exemplary embodiment of the present invention.

FIG. 1 is a sectional view of a schematic configuration of a microwave oven, which is an example of a microwave heating apparatus according to a first exemplary embodiment of the present invention. More specifically, FIG. 1 is a sectional view of microwave oven 1 as seen from the front.

In the following description, a horizontal direction of microwave oven 1 corresponds to a horizontal direction on the page of FIG. 1. A front-back direction of microwave oven 1 corresponds to a direction which is vertical to the page of FIG. 1 and in which the front of the device is connected to the back.

As illustrated in FIG. 1, microwave oven 1 according to the present exemplary embodiment includes: heating chamber space 2 defined by outer walls; magnetron 3; waveguide 4; radiation antenna 5; and mounting table 6. Heating chamber space 2 contains: heating chamber 2a that encloses a space over mounting table 6; and power feeding chamber 2b that encloses a space under mounting table 6. Magnetron 3 is an example of a microwave generator that generates a microwave. Waveguide 4 is an example of a transmitting section via which the microwave generated by magnetron 3 propagates to within heating chamber space 2. Radiation antenna 5 is an example of a waveguide-structured antenna.

Radiation antenna 5 that radiates the microwave inside waveguide 4 to within heating chamber space 2 is provided inside the space in power feeding chamber 2b under mounting table 6.

Mounting table 6 disposed inside heating chamber space 2 has a flat surface on which a food that is object 21 to be heated is placed. Mounting table 6 is disposed so as to cover, from the above, entire power feeding chamber 2b in which radiation antenna 5 is provided. Mounting table 6 covers power feeding chamber 2b so as to prevent radiation antenna 5 from being exposed to heating chamber 2a and forms a bottom surface of heating chamber 2a. Furthermore, a configuration in which mounting table 6 has a flat upper surface (mounting surface) allows a user to easily access the food and wipe dust or other contaminants adhering to mounting table 6.

Mounting table 6 is made of a material, such as glass or ceramic, that transmits microwaves easily. Therefore, when radiation antenna 5 in power feeding chamber 2b disposed under mounting table 6 radiates a microwave, this microwave reliably propagates to within the space in heating chamber 2a over mounting table 6.

Radiation antenna 5 includes coupling part 7 and waveguide structure 8 that are coupled to each other. When magnetron 3 radiates the microwave to within waveguide 4, coupling part 7 delivers this microwave to waveguide structure 8. Waveguide structure 8, which has a box-shaped waveguide structure, for example, leads the microwave delivered by coupling part 7 to within heating chamber 2a.

Coupling part 7 includes coupling shaft 7a and flange 7b. Coupling shaft 7a is coupled to motor 15, which serves as a rotary driver. Waveguide structure 8 is coupled to motor 15 via coupling shaft 7a of coupling part 7 and rotates under the control of controller 17, more specifically, in response to a control signal from controller 17, details of which will be described later. As a result, radiation antenna 5 is driven by motor 15 and thus rotates around coupling shaft 7a of coupling part 7. In this way, a stop location, a rotation period, and a rotation speed, for example, of radiation antenna 5 are controlled. Coupling part 7 is made of a metal, such as aluminized steel. A portion of motor 15 which is coupled to coupling part 7 is made of a fluorine resin, for example.

As illustrated in FIG. 1, coupling shaft 7a of coupling part 7 is disposed so as to pass through opening 2bb via which waveguide 4 communicates with power feeding chamber 2b. In this case, a gap has a predetermined length, such as 5 mm or more, in order to avoid any danger, such sparks, between opening 2bb and coupling shaft 7a passing through opening 2bb. Reserving the gap in this manner enables coupling shaft 7a to efficiently lead the microwave from wave guide 4 to waveguide structure 8 of radiation antenna 5. If the gap is insufficiently small, sparks may be generated, in which case the discharged energy consumes great amounts of electric power. As a result, the electric power radiated to within heating chamber space 2 may excessively decrease, thereby heating the object inefficiently. Even if the gap can prevent sparks, the gap of a small size may cause the electric power to be lost in a conductive part, thereby generating heat. In which case, considerable amounts of electric power are consumed. As a result, the electric power radiated to within heating chamber space 2 may decrease, thereby heating the object inefficiently. For the above reasons, the gap of 5 mm is reserved in the present exemplary embodiment and thus helps efficient heating of the object. The gap of 5 mm is set, because the microwave oven is intended for a typical microwave heating apparatus, for example, whose maximum output is about 1000 W. Obviously, the size of the gap may vary depending on the output level.

Waveguide structure 8 of radiation antenna 5 includes, as main components, open end 13 and a plurality of openings 14a, 14b from which a microwave is to be radiated. The microwave is radiated from open end 13 in a predetermined direction.

In microwave oven 1 according to the present exemplary embodiment, radiation antenna 5 rotates, because coupling part 7 of radiation antenna 5 is coupled to motor 15. In relation to this rotation, the microwave is radiated in different directions from radiation antenna 5.

As illustrated in FIG. 1, microwave oven 1 is provided with infrared sensor 16 in an upper area on a side surface of heating chamber 2a. Infrared sensor 16 detects internal temperatures of a plurality of regions in heating chamber 2a. Then, infrared sensor 16 transmits the detection signals (results) to controller 17.

Waveguide 4 is provided with directional coupler 30, which serves as a reflected wave detector in the present exemplary embodiment. Directional coupler 30 detects an incident wave detection amount and a reflected wave detection amount of the microwave propagating inside waveguide 4 and then transmits detected sensing signals to controller 17. In this case, the incident wave detection amount is detected by means of a sensing signal related to an incident wave (progressive wave) of the microwave propagating from magnetron 3 toward radiation antenna 5. Likewise, the reflected wave detection amount is detected by means of a sensing signal related to a reflected wave of the microwave returning from radiation antenna 5 toward magnetron 3.

Quantity determiner 31, which is disposed in controller 17, for example, determines a quantity of object 21 to be heated, based on a detection signal from directional coupler 30.

Controller 17 controls an oscillation of magnetron 3 and the rotation of motor 15, based on the sensing signals from infrared sensor 16 and directional coupler 30 described above.

In the present exemplary embodiment, controller 17 controls a time over which object 21 is heated, based on a sensing signal from quantity determiner 31. More specifically, when quantity determiner 31 determines that the quantity of object 21 is small, controller 17 shortens the heating time. When quantity determiner 31 determines that the quantity of object 21 is large, controller 17 prolongs the heating time. In this way, controller 17 heats object 21 for an optimized heating time, based on the quantity of object 21 sensed by quantity determiner 31. After completing the heating, controller 17 automatically terminates the heating of object 21. In this manner, controller 17 achieves an automatic heating process on object 21. In this case, controller 17 performs the control so as to terminate the heating promptly, based on the sensing result of quantity determiner 31, especially when quantity determiner 31 determines that no load (no object 21) is present. This makes it possible to avoid excessive heating.

In FIG. 1, grill plate 20 is placed over mounting table 6 as a mounting plate, and object 21 to be heated is placed on grill plate 20.

Specifically, grill plate 20 is placed on side walls 2d of heating chamber 2a. More specifically, grill plate 20 is placed on rails (not illustrated) formed on right and left side walls 2d of heating chamber 2a. Each of right and left side walls 2d extends in the front-back direction. Providing the side rails in this manner enables grill plate 20 to be placed higher than mounting table 6 that forms the bottom surface of heating chamber 2a inside heating chamber 2a. Furthermore, multiple couples of rails may be provided on right and left side walls 2d of heating chamber 2a at different levels (for example, at a high, middle, and low levels). Providing the rails at the plurality of levels allows grill plate 20 to be placed at an adjustable height.

In the above way, microwave oven 1, which is an example of the microwave heating apparatus according to the present exemplary embodiment, is configured.

Next, a description will be given below of a configuration of power feeding chamber 2b in the microwave heating apparatus, with reference to FIGS. 2A and 2B.

Figure 2A:
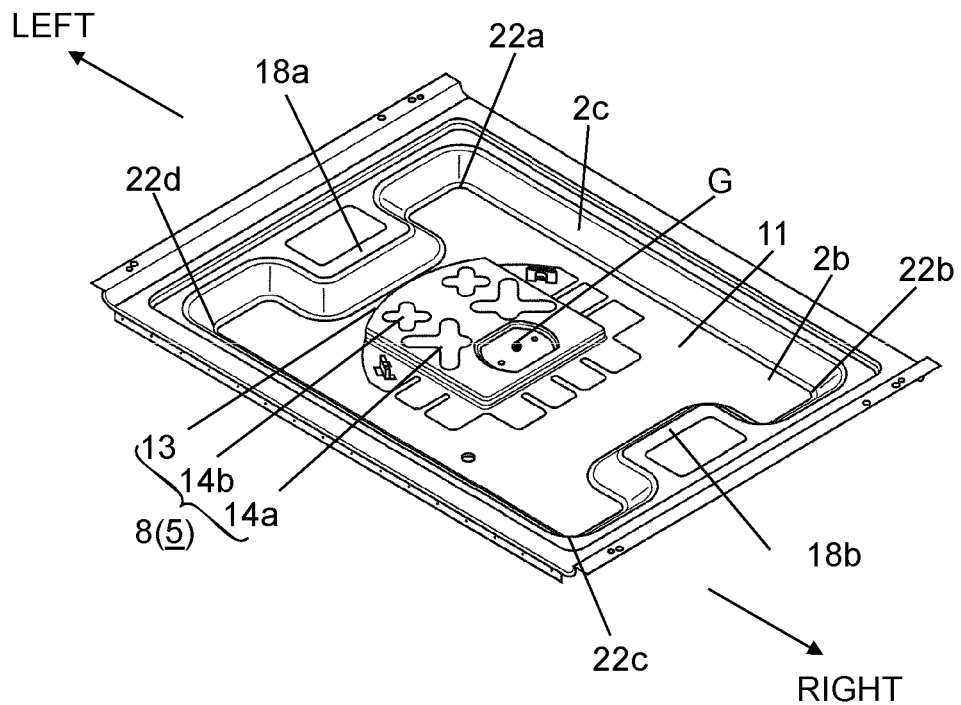
FIG. 2A is a perspective view of a power feeding chamber in a heating section of the microwave heating apparatus according to this exemplary embodiment.

FIG. 2A is a perspective view of power feeding chamber 2b of heating chamber space 2 in which radiation antenna 5 is disposed. FIG. 2B is a plan view of power feeding chamber 2b in FIG. 2A. More specifically, FIG. 2A illustrates the bottom surface of heating chamber space 2 in a case where mounting table 6 is removed.

Figure 2B:
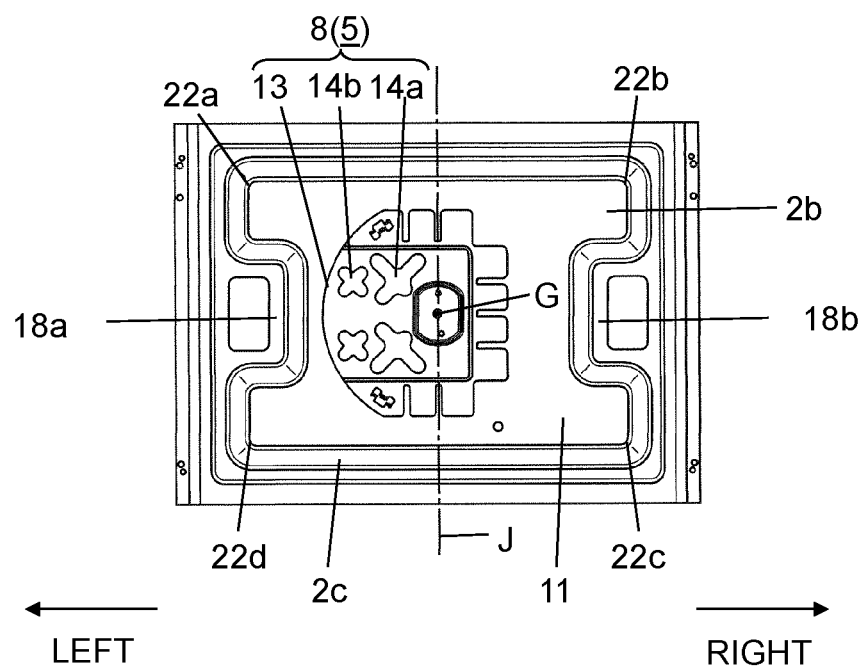
FIG. 2B is a plan view of the power feeding chamber in the heating section of the microwave heating apparatus according to the first exemplary embodiment.

As described above, power feeding chamber 2b illustrated in FIGS. 2A and 2B is disposed immediately below heating chamber 2a and is separated from heating chamber 2a by mounting table 6 (see FIG. 1).

Radiation antenna 5 is provided inside power feeding chamber 2b. More specifically, radiation antenna 5 is disposed with center of rotation G of coupling shaft 7a aligned with a substantially center of power feeding chamber 2b in the front-back and horizontal directions. Thus, center of rotation G is positioned, in the front-back and horizontal directions, immediately below (or below) the center of mounting table 6 that forms the bottom surface of heating chamber 2a.

Bottom surface 11 of power feeding chamber 2b and a lower surface of mounting table 6 define the power feeding space. This power feeding space is symmetric with respect to central line J (see FIG. 2B), which extends in the front-back direction of power feeding chamber 2b and contains center of rotation G of coupling part 7.

Formed in power feeding chamber 2b are projections 18a, 18b, each of which protrudes from bottom surface 11 toward the power feeding space. More specifically, projection 18a is formed on left side wall 2c so as to protrude from bottom surface 11. Likewise, projection 18b is formed on right side wall 2c so as to protrude from bottom surface 11. Magnetron 3 is disposed under projection 18b. In short, projection 18b is provided to reserve a space in which magnetron 3 is disposed.

The microwave radiated from output end 3a (see FIG. 1) of magnetron 3 propagates inside waveguide 4 disposed immediately below power feeding chamber 2b. Then, this microwave is led to waveguide structure 8 via coupling part 7 of radiation antenna 5. The microwave is thereby radiated to within power feeding chamber 2b via open end 13, openings 14a, 14b, and other parts formed in waveguide structure 8 of radiation antenna 5.

Side walls 2c that are side walls enclosing the power feeding space of power feeding chamber 2b are formed as sloped surfaces. Each of these sloped surfaces is formed so as to be inclined upward, more specifically, so as to be widened outwardly toward heating chamber 2a. When radiation antenna 5 radiates a microwave horizontally from open end 13, for example, the microwave is reflected upward by the sloped surfaces of side walls 2c and propagates toward heating chamber 2a.

Power feeding chamber 2b is formed into a rectangular shape in planar view, and two of side walls 2c which have projections 18a, 18b extruding from bottom surface 11 are formed on the short sides (right and left sides in FIG. 2B) of the rectangular shape. Four corners of power feeding chamber 2b correspond to corners 22a, 22b, 22c, and 22d of power feeding chamber 2b. Thus, projection 18a is formed between corners 22a and 22d; projection 18b is formed between corners 22b and 22c of power feeding chamber 2b.

As described above, power feeding chamber 2b of microwave oven 1 is configured.

Figure 3A:
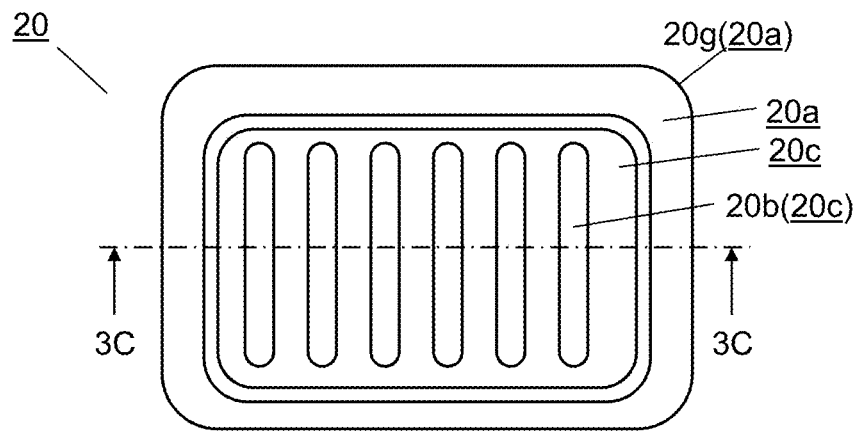
FIG. 3A is a plan view of a grill plate to be used in a grill mode.
Figure 3B:
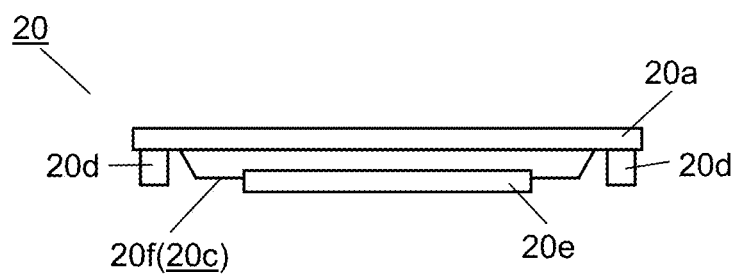
FIG. 3B is a side view of the grill plate to be used in the grill mode.
Figure 3C:
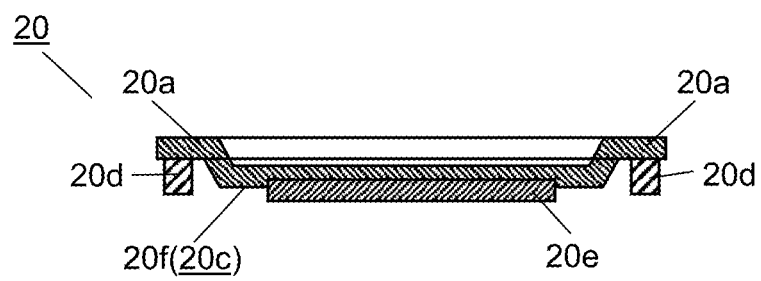
FIG. 3C is a longitudinal section view of the grill plate to be used in the grill mode.

With reference to FIGS. 3A to 3C, a configuration of grill plate 20 in microwave oven 1 will be described below.

FIG. 3A is a plan view of grill plate 20 as seen from the top. FIG. 3B is a side view of grill plate 20 as seen from one side. FIG. 3C illustrates a cross section taken along line 3C-3C in FIG. 3A.

As illustrated in FIGS. 3A to 3C, grill plate 20 includes: periphery 20a that takes the shape of a picture frame, for example; plate 20c; and insulating parts 20d. Plate 20c has a plurality of grooves 20b each of which has a predetermined depth. Grooves 20b are disposed side by side on the inner side of periphery 20a. It should be noted that grooves 20b are not illustrated in FIG. 3C. Insulating parts 20d are disposed under periphery 20a.

In a grill mode, details of which will be described later, object 21 to be heated is placed on plate 20c of grill plate 20, and then disposed inside heating chamber 2a and heated. More specifically, grill plate 20 is disposed inside heating chamber 2a with insulating parts 20d being in contact with the rails provided on right and left side walls 2d in heating chamber 2a.

Plate 20c is provided with microwave absorbing heat generator 20e (for example, ferrite) on its lower, outer surface (opposite facing mounting table 6). The lower, outer surface of plate 20c forms bottom surface 20f of grill plate 20.

In the above way, grill plate 20 is configured.

Next, a description will be given of a function and effect of the microwave in the grill mode, which is a mode of heating object 21 placed on grill plate 20.

Periphery 20a and plate 20c of grill plate 20 are each made of a material, such as iron or aluminum, that does not transmit microwaves. Each insulating part 20d is made of an insulating material, such as polyphenylene sulfide (PPS) resin, that transmits microwaves. Insulating parts 20d insulate grill plate 20 from side walls 2d of heating chamber 2a.

When object 21 starts being heated in the grill mode, a microwave radiated from radiation antenna 5 propagates to bottom surface 20f of grill plate 20 configured above, as arrows E illustrated in FIG. 1. This microwave is absorbed by microwave absorbing heat generator 20e provided on bottom surface 20f, so that heat is generated in microwave absorbing heat generator 20e. The generated heat is transferred to bottom surface 20f of grill plate 20, so that bottom surface 20f is heated. In this way, object 21 on plate 20c of grill plate 20 is heated indirectly by the microwave.

As described above, periphery 20a and plate 20c of grill plate 20 are each made of a material that does not transmit microwaves. This means that object 21 is not heated by microwaves that have transmitted via periphery 20a and plate 20c of grill plate 20.

However, a gap that allows microwaves to pass therethrough is secured between side walls 2d of heating chamber 2a and grill plate 20. More specifically, the rails disposed on side walls 2d of heating chamber 2a are in contact with insulating parts 20d of grill plate 20. Each insulating part 20d is made of a material, such as PPS resin, that transmits microwaves. Therefore, the microwave propagates, via insulating parts 20d, between grill plate 20 and right side wall 2d of heating chamber 2a and between grill plate 20 and left side wall 2d.

Provided in front of grill plate 20 is a door (not illustrated) made of a glass plate, for example. This door is provided in a front opening of heating chamber 2a in an openable and closable manner. For example, the door includes: an outer conductive part made of an electromagnetically shielded perforated metal; and an inner glass plate which isolates inner heat from the outside and from which dust can be removed easily. When radiation antenna 5 radiates the microwave, part of this microwave passes through the glass plate in front of grill plate 20, then is reflected by the perforated metal, and goes into heating chamber 2a disposed over grill plate 20.

For example, side wall 2d of heating chamber 2a in rear of grill plate 20 may have projections. In this case, the microwave may propagate in gaps between the projections and go into heating chamber 2a disposed over grill plate 20.

As illustrated in FIG. 3A, periphery 20a of grill plate 20 is provided with outer corner parts 20g, each of which has an arched shape. Therefore, gaps are reserved between outer corner parts 20g and angled corners of heating chamber 2a. Via these gaps, the microwave goes into heating chamber 2a disposed over grill plate 20.

The above configuration generates a microwave flow, as indicated by arrows F in FIG. 1. Along this microwave flow, the microwave goes into heating chamber 2a over grill plate 20 on which object 21 is placed, via the gaps, for example, between grill plate 20 and side walls 2d of heating chamber 2a. This microwave flow causes object 21 to be heated directly.

In the grill mode, which is a mode of heating object 21, as described above, the arrangement of FIG. 1 generates two, namely, first and second microwave flows. The first microwave flow, denoted by arrows E, causes object 21 to be heated indirectly, whereas the second microwave flow, denoted by arrows F, causes object 21 to be heated directly. In the grill mode, thus, the microwave propagates along the two microwave flows. Object 21 is thereby heated with the microwave radiated in different directions.

In the above way, object 21 is heated both directly and indirectly with the microwave in the grill mode.

Next, a description will be given of a method using microwave oven 1 configured above in which a quantity of object 21 to be heated is determined based on a detection signal from directional coupler 30.

In the present exemplary embodiment, controller 17 performs the method of determining a quantity of object 21 to be heated, based on the detection signal, more specifically, the reflected wave detection amount from directional coupler 30 conceived of by the inventors of the present application.

The inventors of the present application have diligently studied a method of performing the heating control more appropriately in accordance with a state of object 21 to be heated. More specifically, the inventors of the present application have diligently studied a method of controlling the grill mode in which object 21 is heated and grilled on grill plate 20 disposed over mounting table 6. As a result of the study, the inventors of the present application have conceived of the method of determining a quantity of object 21 to be heated, based on a reflected wave detection amount detected by directional coupler 30 in relation to a direction in which radiation antenna 5 that radiates a microwave faces (in relation to a rotation angle of radiation antenna 5).

Figure 4:
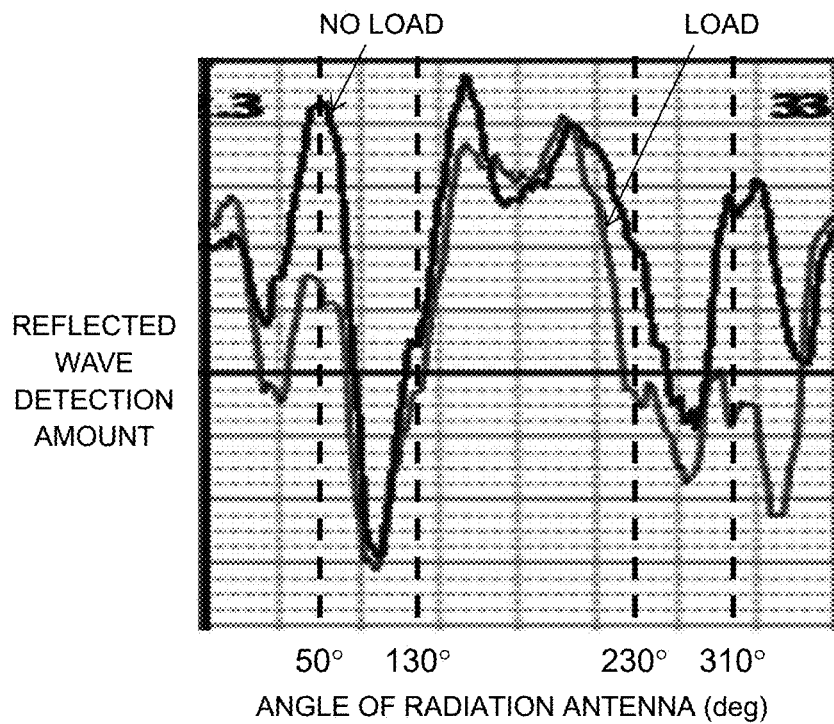
FIG. 4 illustrates characteristics of a detection amount of a reflected wave in the microwave heating apparatus according to this exemplary embodiment, in relation to an angle of a radiation antenna.

FIG. 4 illustrates characteristics of the reflected wave detection amount detected by directional coupler 30 in microwave oven 1 configured as in FIGS. 1 to 3C, in relation to the direction in which radiation antenna 5 faces (the rotation angle of radiation antenna 5).

In FIG. 4, a horizontal axis represents the angle of radiation antenna 5, namely, a direction in which open end 13 faces (rotation angle of open end 13). Further, an angle of radiation antenna 5 is set to 0 degrees as a reference when open end 13 faces in a direction from the front to rear of the door of microwave oven 1 (toward the opposite side of the door). Thus, when radiation antenna 5 is disposed at an angle of 90 degrees, radiation antenna 5 faces toward the right side. When radiation antenna 5 is disposed at an angle of 180 degrees, radiation antenna 5 faces toward the front side. When radiation antenna 5 is disposed at an angle of 270 degrees, radiation antenna 5 faces toward the left side.

FIG. 4 illustrates two characteristics of the reflected wave detection amount obtained in a case where "no load" is placed on grill plate 20 and where a "load" is placed on grill plate 20. The load corresponds to object 21 to be heated, for example.

More specifically, the "load" state indicates a characteristic of the reflected wave detection amount obtained during heating of object 21. This characteristic depends on the quantity of object 21. The "no load" state indicates a characteristic of the reflected wave detection amount obtained when microwave oven 1 operates in advance with no object to be heated placed inside, for example, in the course of the development or prior to a shipment. The characteristic of the reflected wave detection amount in the "no load" state is stored in advance, for example, in a storage unit (not illustrated) of controller 17.

Controller 17 determines the quantity of object 21 to be heated by comparing the characteristics of the stored "no load" state and the "load" state in which object 21 is being heated. Specifically, when object 21 is placed on grill plate 20, object 21 absorbs some of the microwave radiated from radiation antenna 5. As a result, the reflected wave is weakened, so that the reflected wave detection amount detected by directional coupler 30 decreases.

In short, it is possible to estimate the quantity of object 21 to be heated, based on how much the reflected wave detection amount in the "load" state is smaller than the reflected wave detection amount in the "no load" state.

In should be noted that there are some (rotation) angles, such as angles of 50 degrees and 310 degrees, of radiation antenna 5 at which the difference between the reflected wave detection amounts in the "no load" and "load" states increases, as illustrated in FIG. 4.

When radiation antenna 5 faces in a direction in which the difference between the reflected wave detection amounts in the "no load" and "load" states increases, it is possible to easily identify this difference even if the quantity of object 21 to be heated is small.

When radiation antenna 5 faces in a direction in which the difference between the reflected wave detection amounts in the "no load" and "load" states decreases, it is difficult to identify this difference, because the difference is small. Thus, it is difficult to finely determine the quantity of object 21 to be heated when radiation antenna 5 faces in the direction in which the difference in the reflected wave detection amount decreases.

Hereinafter, with reference to FIG. 5, a discussion will be given about a reason why the difference between the reflected wave detection amounts in the "no load" and "load" states increases when an angle of radiation antenna 5 is set to 50 degrees and 310 degrees.

Figure 5:
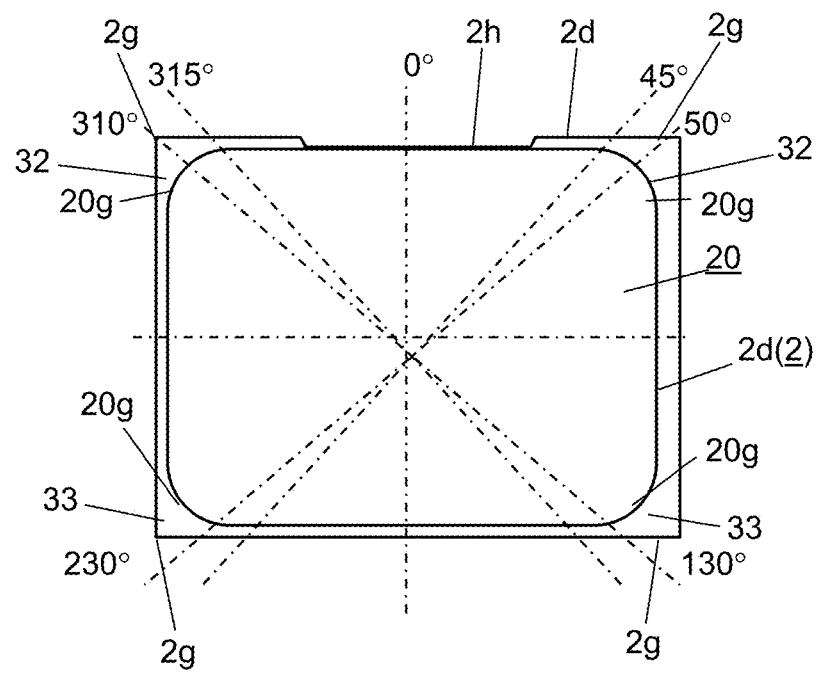
FIG. 5 illustrates a relationship between the grill plate and a gap in a heating chamber, in the microwave heating apparatus according to this exemplary embodiment.

FIG. 5 illustrates a relationship of a gap between grill plate 20 and heating chamber 2a in the microwave heating apparatus as seen from the top. More specifically, FIG. 5 illustrates a positional relationship between grill plate 20 and side walls 2d of heating chamber 2a.

As illustrated in FIG. 5, heating chamber 2a has projection 2h. When grill plate 20 is moved into heating chamber 2a, grill plate 20 abuts against projection 2h. Then, projection 2h restricts further movement of grill plate 20 toward a depth of heating chamber 2a.

Heating chamber 2a has inner wall corners 2g each of which is typically formed into an angled shape having a substantially (subsuming completely) right angle. Grill plate 20 has outer corner parts 20g each of which is typically formed into a curved shape. In this case, inner wall corner 2g of heating chamber 2a and outer corner parts 20g of grill plate 20 form gaps 32 in-between in a rear portion of heating chamber 2a.

In a front portion (closer to the door) of heating chamber 2a, similar to the rear portion of heating chamber 2a, inner wall corner 2g of heating chamber 2a and outer corner parts 20g of grill plate 20 form gaps 33 in-between. However, a projection, such as projection 2h, is not formed within the front portion of heating chamber 2a, as opposed to the rear portion. Therefore, each gap 33 in the front portion is smaller than each gap 32 in the rear portion.

The reason why projection 2h is provided in the rear portion of heating chamber 2a is to dispose a convection fan (not illustrated) in this rear portion.

Each of heating chamber 2a and grill plate 20 is typically formed into a rectangular shape extending in the horizontal direction. In the microwave heating apparatus according to the present exemplary embodiment, due to the above shapes, for example, a position in which gaps 32 within the rear portion become the widest corresponds to the (rotation) angles of 50 degrees and 310 degrees at which radiation antenna 5 is disposed, as illustrated in FIG. 5 (the rotation angles of 50 degrees and 310 degrees being on an outer side of the rotation angles of 45 degrees and 315 degrees). A position in which gaps 33 within the front portion become the widest corresponds to the (rotation) angles of 130 degrees and 230 degrees at which radiation antenna 5 is disposed (the rotation angles of 130 degrees and 230 degrees differing from the rotation angles of 50 degrees and 310 degrees).

As illustrated in FIG. 4, the case where the rotation angles of radiation antenna 5 are set to 50 degrees and 310 degrees corresponds to a case where the difference between the reflected wave detection amounts in the "no load" and "load" states becomes the largest. In the case where the rotation angles of radiation antenna 5 are set to 130 degrees and 230 degrees, the difference in the reflected wave detection amount becomes the second largest, which follows the case where the rotation angles are set to 50 degrees and 310 degrees.

As can be estimated from the above result, when radiation antenna 5 faces in a direction in which gaps 32, 33 between heating chamber 2a and grill plate 20 are widened, the difference between the reflected wave detection amounts in the "no load" and "load" states increases. A reason is that, when radiation antenna 5 faces toward a gap, the microwave, the intensity of which is proportional to a size of the gap, passes through the gap and propagates above grill plate 20. Then, the microwave that has propagated above grill plate 20 strikes object 21 to be heated and is absorbed by object 21. As a result, the reflected wave that is incident on and detected by the reflected wave detector of directional coupler 30 is weakened. This means that the difference between the reflected wave detection amounts in the "no load" and "load" states varies depending on the size of the gap toward which radiation antenna 5 faces.

The above reason why the difference between the reflected wave detection amounts in the "no load" and "load" states increases when the rotation angles of radiation antenna 5 are set to 50 degrees and 310 degrees correlates with the result in FIG. 4. In other words, the reason why the difference between the reflected wave detection amounts in the "no load" and "load" states increases as illustrated in FIG. 4 can be related to the size of the gap toward which radiation antenna 5 faces as illustrated in FIG. 5.

In view of the result, a description will be given of an example of estimating the quantity of object 21, such as a food, to be heated, based on the reflected wave detection amount, with reference to FIG. 6.

Figure 6:
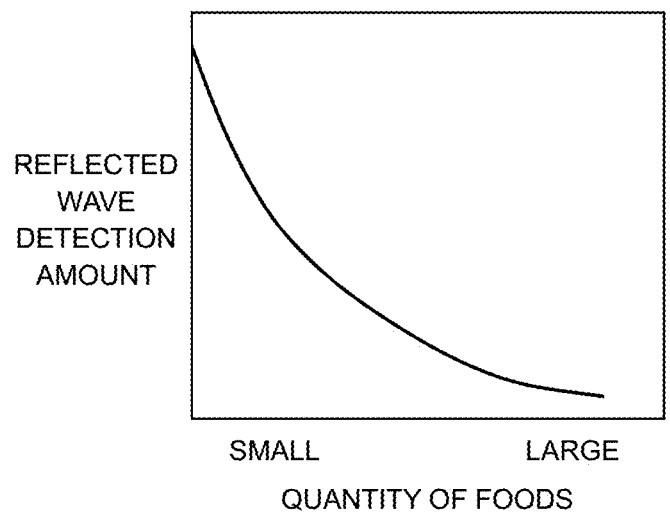
FIG. 6 illustrates a characteristic of the detection amount of the reflected wave in the microwave heating apparatus according to this exemplary embodiment, in relation to a quantity of a food placed inside.

FIG. 6 illustrates a characteristic of the reflected wave detection amount in the microwave heating apparatus according to this exemplary embodiment, in relation to a quantity of a food placed inside.

As can be seen from FIG. 6, as the quantity of the food decreases, the reflected wave detection amount tends to increase. In other words, as the quantity of object 21 to be heated increases, the reflected wave detection amount tends to decrease.

Therefore, controller 17 controls heating of object 21, such as a food, in a manner that will be described below.

First, quantity determiner 31 of controller 17 determines the quantity of object 21 to be heated, from the reflected wave detection amount detected by the reflected wave detector of directional coupler 30. Then, when the quantity of object 21 is large, controller 17 controls the heating so that object 21 is heated for a long time. When the quantity of object 21 is small, controller 17 controls the heating so that object 21 is heated for a short time.

When object 21 to be heated is not present, controller 17 controls the heating so that it terminates promptly. In this way, it is possible to ensure energy saving and safety properties of microwave oven 1.

According to the present exemplary embodiment, as described above, microwave oven 1 includes: heating chamber 2a that accommodates object 21 to be heated; microwave generator 3 that generates a microwave to be supplied to heating chamber 2a; and waveguide 4 through which the microwave generated by magnetron 3 that serves as the microwave generator propagates to heating chamber space 2. Furthermore, microwave oven 1 includes: reflected wave detector 30 that detects at least part of a reflected wave inside waveguide 4; quantity determiner 31 that determines a quantity of object 21 from a reflected wave detection amount detected by reflected wave detector 30; and controller 17 that controls magnetron 3 based on the quantity determined by quantity determiner 31.

According to this configuration, microwave oven 1 is provided with reflected wave detector 30 that detects the at least part of the reflected wave inside waveguide 4. When object 21 that absorbs the microwave is absent, reflected wave is strong. When object 21 is present, the microwave is absorbed by object 21 and thus the reflected wave is weak. As the quantity of object 21 becomes greater, a larger amount of microwave is absorbed by object 21, and thus the reflected wave is weakened. In short, quantity determiner 31 can detect a load placed on object 21, based on the reflected wave detection amount detected by reflected wave detector 30. This enables microwave oven 1 to determine the quantity of object 21 to be heated without using a detector that detects a load. Consequently, it is possible to heat object 21 efficiently, based on the determined quantity.

According to the present exemplary embodiment, quantity determiner 31 in microwave oven 1 may determine the quantity of object 21 by comparing the reflected wave detection amount detected by reflected wave detector 30 during heating with the reflected wave detection amount detected by reflected wave detector 30 when the object is absent. In this way, quantity determiner 31 uses, as a reference amount, the reflected wave detection amount obtained when object 21 is absent and then determines the quantity of object 21 precisely based on a difference between the reference amount and the reflected wave detection amount obtained during the heating.

According to the present exemplary embodiment, microwave oven 1 further includes: radiation antenna 5 that radiates the microwave propagating inside waveguide 4 to heating chamber space 2; and motor 15 that rotates radiation antenna 5. Controller 17 controls an output of magnetron 3, based on the quantity determined by quantity determiner 31 and a direction in which radiation antenna 5 faces by controlling driving of motor 15. In this case, quantity determiner 31 may compare the reflected wave detection amount detected by reflected wave detector 30 during the heating with the reflected wave detection amount detected by reflected wave detector 30 when the object 21 is absent, and may determine the quantity of object 21 when radiation antenna 5 faces in a direction in which a difference between the compared reflected wave detection amounts is maximized. This makes it possible to improve a resolution at which the quantity of object 21 is determined. Consequently, it is possible to determine the quantity of object 21 precisely, thereby heating object 21 appropriately.

According to the present exemplary embodiment, quantity determiner 31 in microwave oven 1 compares the reflected wave detection amount detected by reflected wave detector 30 during the heating with the reflected wave detection amount detected by reflected wave detector 30 when object 21 is absent. Then, quantity determiner 31 may determine in which direction radiation antenna 5 faces when a difference between the compared reflected wave detection amounts is maximized, and may further determine the quantity of object 21, based on a difference between the reflected wave detection amounts obtained when radiation antenna 5 faces in the determined direction and when radiation antenna 5 faces in a different direction.

When many microwave ovens 1 are mass-produced, in general, their characteristics may differ from one another due to a tolerance of a gap size which is set to allow for an eccentricity of coupling shafts 7a of radiation antennas 5 and variations in shapes of heating chambers 2a and grill plates 20, for example. Thus, when individual radiation antennas 5 in microwave ovens 1 face in the same direction, their reflected wave detection amounts may somewhat differ from one another. For this reason, the quantity of object 21 is determined from an average of the reflected wave detection amounts obtained when radiation antenna 5 faces in the direction in which the difference is maximized and when radiation antenna 5 faces in the different direction. This makes it possible to absorb variations in reflected wave detection amounts due to the individual characteristic differences, thereby determining the quantity of object 21 more precisely. More specifically, as described with reference to FIGS. 4 and 5, for example, the quantity of object 21 can be determined from an average of the reflected wave detection amounts obtained at a rotation angle of 50 degrees, 310 degrees at which the reflected wave detection amounts decrease and at a different angle of 130 degrees, 230 degrees.

According to the present exemplary embodiment, microwave oven 1 further includes grill plate 20 that latches onto an interior of heating chamber 2a so as to vertically divide heating chamber space 2. Object 21 to be heated is placed on grill plate 20. Microwave absorbing heat generator 20e is mounted on a rear surface of grill plate 20. Grill plate 20 has outer corner parts 20g each of which has a curved shape larger than a corresponding one of inner wall corners 2g of heating chamber 2a. Gaps 32, 33 are formed between outer corner parts 20g and inner wall corners 2g. Controller 17 may control radiation antenna 5 so as to face in a direction toward gaps 32, 33. Quantity determiner 31 may determine the quantity of object 21 based on a reflected wave detection amount obtained when radiation antenna 5 faces in this direction.

The configuration in which radiation antenna 5 faces in a direction toward gaps 32, 33 causes the microwave radiated from radiation antenna 5 to pass through gaps 32, 33 and propagate above grill plate 20 more easily than a configuration in which radiation antenna 5 faces in any other direction. In this case, a larger proportion of microwave strikes object 21. The reflected wave detection amount varies more greatly depending on a varying quantity of object 21. Consequently, quantity determiner 31 can determine the quantity of object 21 to be heated precisely.

Second Exemplary Embodiment

Figure 7:
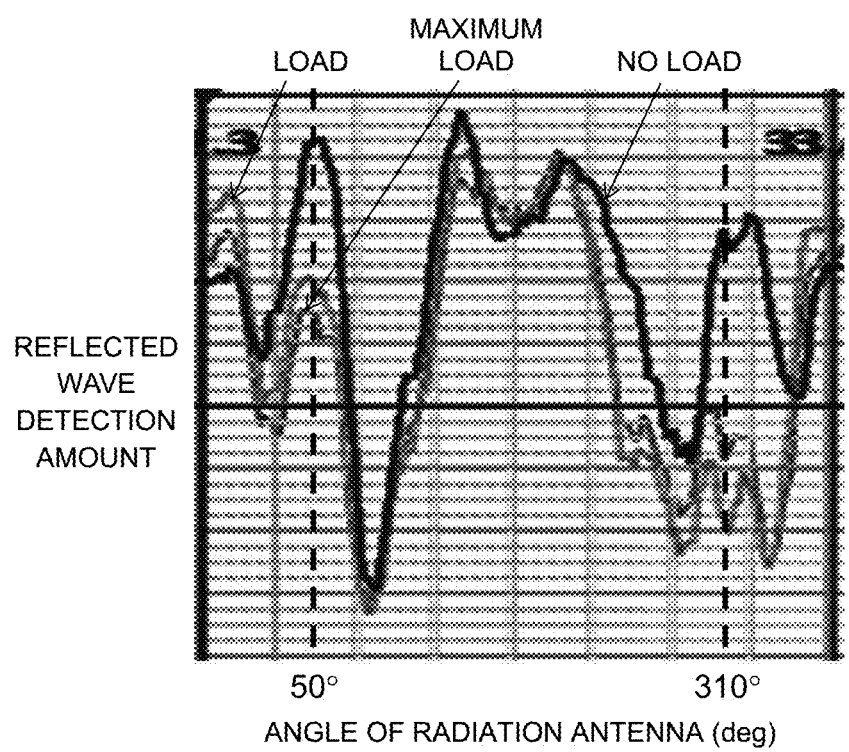
FIG. 7 illustrates characteristics of a detection amount of a reflected wave in a microwave heating apparatus according to a second exemplary embodiment of the present invention, in relation to an angle of a radiation antenna.

With reference to FIG. 7, a description will be given below of a microwave heating apparatus according to a second exemplary embodiment of the present invention.

FIG. 7 illustrates characteristics of a reflected wave detection amount in microwave oven 1, which serves as the microwave heating apparatus according to the second exemplary embodiment of the present invention, in relation to an angle of radiation antenna 5.

As illustrated in FIG. 7, microwave oven 1 according to the present exemplary embodiment differs from microwave oven 1 according to the foregoing first exemplary embodiment, in controlling heating in consideration of a characteristic obtained when object 21 applies a "maximum load", namely, in consideration of a reflected wave detection amount obtained when object 21 is in a predetermined maximum quantity. However, a basic configuration of microwave oven 1 is substantially the same as the configuration of microwave oven 1 according the first exemplary embodiment. Therefore, constituent elements substantially identical to the constituent elements of the first exemplary embodiment are denoted by the identical reference marks and their detailed description will be omitted.

When developed or before shipped, microwave oven 1 according to the present exemplary embodiment is operated in advance with a predetermined maximum quantity of object 21 placed inside, namely, in a "maximum load" state, a characteristic of a reflected wave detection amount is measured. Then, the characteristic of the reflected wave detection amount in the "maximum load" state is stored in a storage unit (not illustrated) of controller 17.

It this case, the characteristic of the reflected wave detection amount obtained when microwave oven 1 operates without object 21 placed inside is also stored in advance in the storage unit of controller 17, as described in the first exemplary embodiment.

More specifically, in microwave oven 1 according to the present exemplary embodiment, first, a reflected wave detector in directional coupler 30 detects a characteristic of a reflected wave detection amount in a "load" state during the heating of object 21.

Then, quantity determiner 31 in controller 17 compares characteristics of the detected, reflected wave detection amount in the "load" state and reflected wave detection amounts in the "no load" and "maximum load" states which are both stored in advanced.

From the comparison result, quantity determiner 31 determines which positions of the characteristics of the reflected wave detection amounts in the "no load" and "maximum load" correspond to the characteristic of the reflected wave detection amount in the "load" state obtained during the heating. Based on the determined quantity of object 21 being currently heated, controller 17 controls the hearing of object 21.

According to the present exemplary embodiment, quantity determiner 31 compares a reflected wave detection amount detected by reflected wave detector 30 during heating of object 21, a reflected wave detection amount detected by reflected wave detector 30 when object 21 is absent, and a reflected wave detection amount detected by reflected wave detector 30 when object 21 is in a predetermined maximum quantity. Based on the comparison result, quantity determiner 31 determines a quantity of object 21.

In the above way, it is possible to determine whether of the reflected wave detection amounts obtained when object 21 is absent and when object 21 is in a predetermined maximum quantity is closer to the reflected wave detection amount obtained during the heating of object 21. Consequently, this configuration can determine the quantity of object 21 more precisely than a configuration in which the reflected wave detection amount obtained during the heating of object 21 is compared to the reflected wave detection amount obtained when object 21 is absent.

Third Exemplary Embodiment

Figure 8:
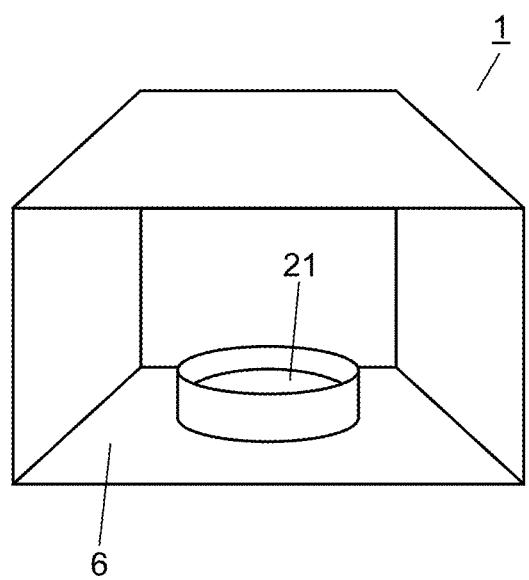
FIG. 8 is a front view of a schematic configuration of a microwave heating apparatus according to a third exemplary embodiment of the present invention.

With reference to FIG. 8, a description will be given below of a microwave heating apparatus according to a third exemplary embodiment of the present invention.

FIG. 8 is a schematic configuration of microwave oven 1, which serves as a microwave heating apparatus according to the third exemplary embodiment of the present invention. More specifically, FIG. 8 is a perspective view of microwave oven 1 as seen from the front.

As illustrated in FIG. 8, microwave oven 1 according to the present exemplary embodiment differs from microwave ovens 1 according to the foregoing first and second exemplary embodiments in that object 21 to be heated is placed directly on mounting table 6 without using a grill plate and then is heated in a "warming mode", for example. However, a basic configuration of microwave oven 1 is substantially the same as the configuration of microwave oven 1 according to the first exemplary embodiment. Therefore, constituent elements substantially identical to the constituent elements of the first exemplary embodiment are denoted by the identical reference marks and their detailed description will be omitted.

In microwave oven 1 according to the present exemplary embodiment, object 21, such as a food, to be heated has a considerably large size and is placed directly on mounting table 6 with a container having a diameter of about 150 mm, for example, in-between. Then, microwave oven 1 is set to the "warming mode" and heats object 21 with a microwave radiated from magnetron 3.

In general, when object 21 is absent, a reflected wave detection amount in the "warming mode" is much greater than a reflected wave detection amount in the above "grill mode".

This is because the state in which object 21 is absent in the "grill mode" means a state in which object 21 is absent but grill plate 20 is present. As described above, microwave absorbing heat generator 20*e* is provided on a rear surface of grill plate 20. Thus, even when object 21 is absent, microwave absorbing heat generator 20*e* absorbs some of the microwave. As a result, the microwave is not reflected greatly in the "grill mode".

In the present exemplary embodiment, grill plate 20 provided with microwave absorbing heat generator 20*e* is not present. Therefore, the reflected wave detection amount obtained when object 21 is absent increases greatly in the "warming mode".

This means that the reflected wave detection amount obtained when object 21 is present differs greatly from the reflected wave detection amount obtained when object 21 is absent. Consequently, in the "warming mode", quantity determiner 31 can more easily determine a quantity of object 21 to be heated by using a reflected wave detection amount.

In each of the exemplary embodiments described above, as an example, quantity determiner 31 determines a quantity of object 21 to be heated while radiation antenna 5 is rotating; however, the present invention is not limited to this configuration. As an alternative example, radiation antenna 5 may stop for a preset time while facing in a direction in which the quantity is to be determined. In this case, radiation antenna 5 may face in a preset direction for a long time, in comparison with the configuration in which radiation antenna 5 rotates at a constant speed. This makes it possible to further improve a precision with which the quantity of object 21 is determined. Radiation antenna 5 does not necessarily have to stop completely. Instead, radiation antenna 5 may rotate at a lower speed when facing in a preset direction, thereby increasing the time. As further another alternative example, a reference direction may be set to a given direction, and radiation antenna 5 may rotate in the forward and reverse directions within a narrow angle range, thereby increasing the time.

In each of the exemplary embodiments described above, as an example, an angle at which radiation antenna 5 stops is set to a target angle precisely, such as 50 degrees sharp; however, the present invention is not limited to this configuration. For example, an averaging process for averaging a displacement of a rotation of radiation antenna 5 may be performed. Then, radiation antenna 5 may stop while shifted from 50 degrees in a range from −10 degrees to +10 degrees. A reason is that motor 15 typically engages with radiation antenna 5 with some margin therebetween. In this case, motor 15 is rotatable both clockwise and counterclockwise, especially in a case where motor 15 is a stepping motor. Therefore, if controller 17 controls radiation antenna 5 so as to stop at a target angle, an actual angle at which radiation antenna 5 stops may be shifted easily from the target angle by 10 degrees or so, depending on its rotation direction and the margin.

In each of the foregoing exemplary embodiments, as an example, directional coupler 30 is used as a reflected wave detector; however, the present invention is not limited to this configuration. Directional coupler 30 can also detect an incident wave in addition to a reflected wave. Therefore, quantity determiner 31 may calculate an energy absorbed by object 21 from a difference between the incident and reflected waves detected by directional coupler 30. From the calculated value, then, quantity determiner 31 may determine the quantity of object 21.

Details of a control process using infrared sensor 16 have not been described in the foregoing exemplary embodiments; however, the quantity of object 21 to be heated may be determined not only based on information from the reflected wave detector but also based on information (temperature of object 21) sensed by infrared sensor 16. When object 21 is frozen, its dielectric constant differs from a dielectric constant of object 21 kept at room temperature. This means that ease with which object 21 absorbs the microwave may vary, depending on a state of object 21. First, infrared sensor 16 detects a temperature of object 21 to be heated. Based on the detected temperature, then, quantity determiner 31 may determine the quantity of object 21. In this case, quantity determiner 31 may switch its sequence to a quantity determination sequence that involves using both infrared sensor 16 and the reflected wave detector, and may make the determination.

More specifically, quantity determiner 31 has sequence A of the quantity determination which is to be selected when object 21 is frozen and sequence B of the quantity determination which is to be selected when object 21 is kept at room temperature. Based on the temperature of object 21 detected by infrared sensor 16, then, quantity determiner 31 switches between sequences A and B and determines the quantity of object 21. In general, frozen object 21 tends to absorb a smaller amount of microwave, and thus the reflected wave detection amount increases. Object 21 at room temperature tends to absorb a larger amount of microwave, and thus the reflected wave detection amount decreases. If the characteristic in FIG. 6 is represented as characteristic C of object 21 at room temperature, for example, characteristic D of frozen object 21 exhibits a larger reflected wave detection amount than the curve in FIG. 6. Therefore, based on the temperature of object 21 detected by infrared sensor 16, quantity determiner 31 selects one of sequence A designed in accordance with characteristic C and sequence B designed in accordance with characteristic D (not illustrated), and then determines the quantity of object 21. This makes it possible to improve a precision with which the quantity of object 21 is determined.

In each of the foregoing exemplary embodiments, as an example, the reflected wave detection amount is measured when object 21 to be heated is absent, and stored in advance; however, the present invention is not limited to this configuration. As an alternative example, immediately after buying a product, a user may operate microwave oven 1 on low output power with object 21 absent therefrom or with little load placed thereon. Then, the user may store the reflected wave detection amount. More specifically, if microwave oven 1 has a maximum power of 1000 W, for example, the user may check a reflected wave detection amount when microwave oven 1 operates at 300 W and may store a reflected wave detection amount obtained as by multiplying the resultant value by 1000/300. A reference load may be set to a light load, such as 10 cubic centimeters (cc) of water, and a reflected wave detection amount may be stored.

[Detailed Description of Directional Coupler]

With reference to FIGS. 9 to 12, a detailed description will be given below of a configuration and operation of the directional coupler according to the above exemplary embodiments.

As described above, the components of the directional coupler are the reflected wave detector and the incident wave detector; the reflected wave detector detects at least part of the reflected wave of the microwave propagating inside wave guide 4, and the incident wave detector detects at least part of the incident wave (also referred to as the progressive wave) inside waveguide 4.

Figure 9:
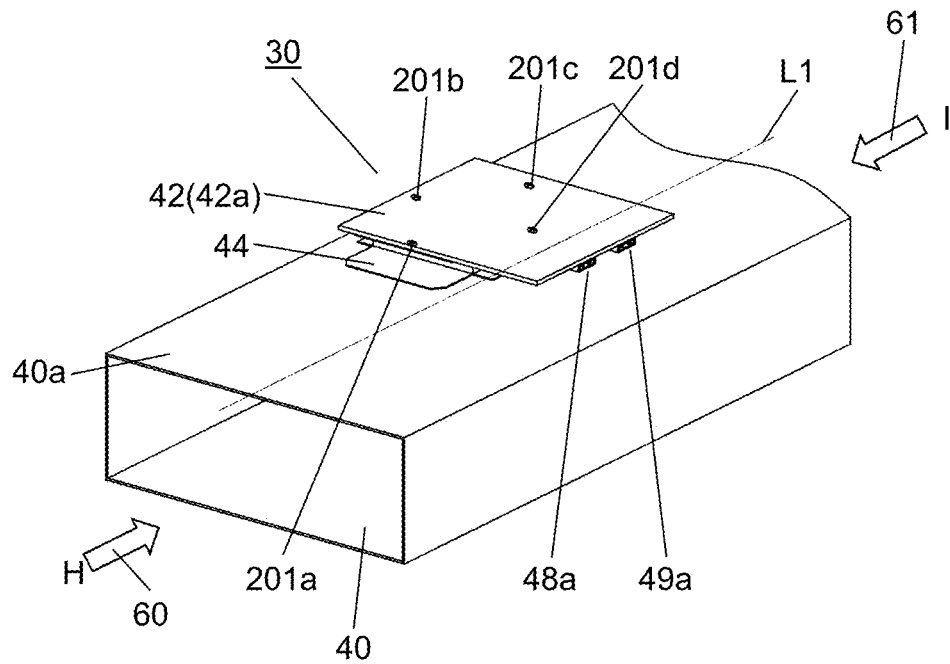
FIG. 9 is a perspective view of a directional coupler in a microwave heating apparatus according to an exemplary embodiment of the present invention.
Figure 10:
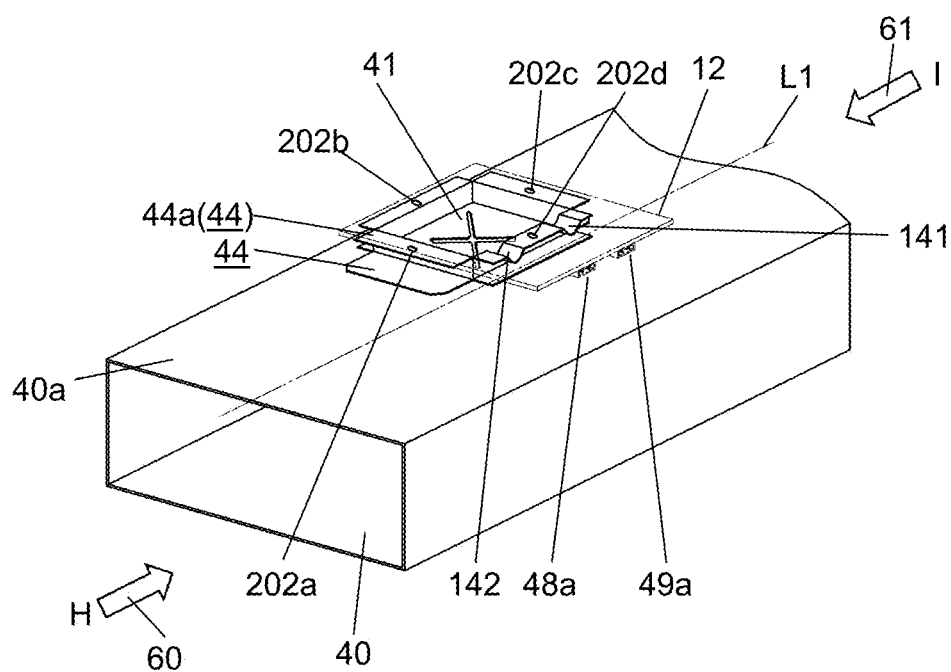
FIG. 10 is a perspective view of the directional coupler in FIG. 9 in a case where its printed circuit board is illustrated in a transparent manner.
Figure 11:
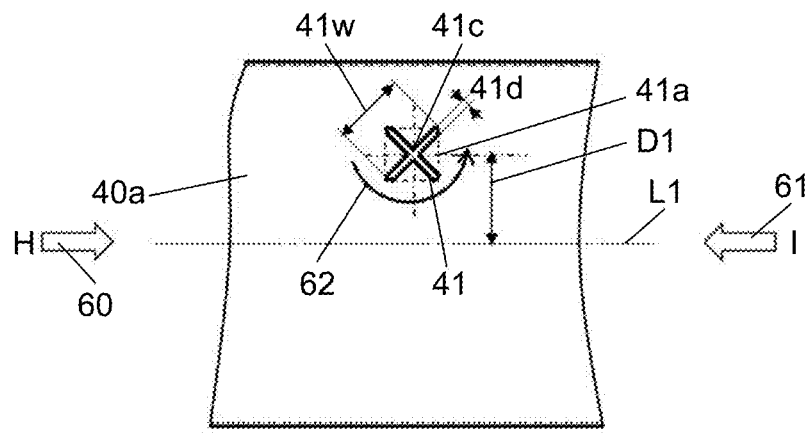
FIG. 11 illustrates a configuration of a cross opening in the directional coupler in FIG. 9.
Figure 12:
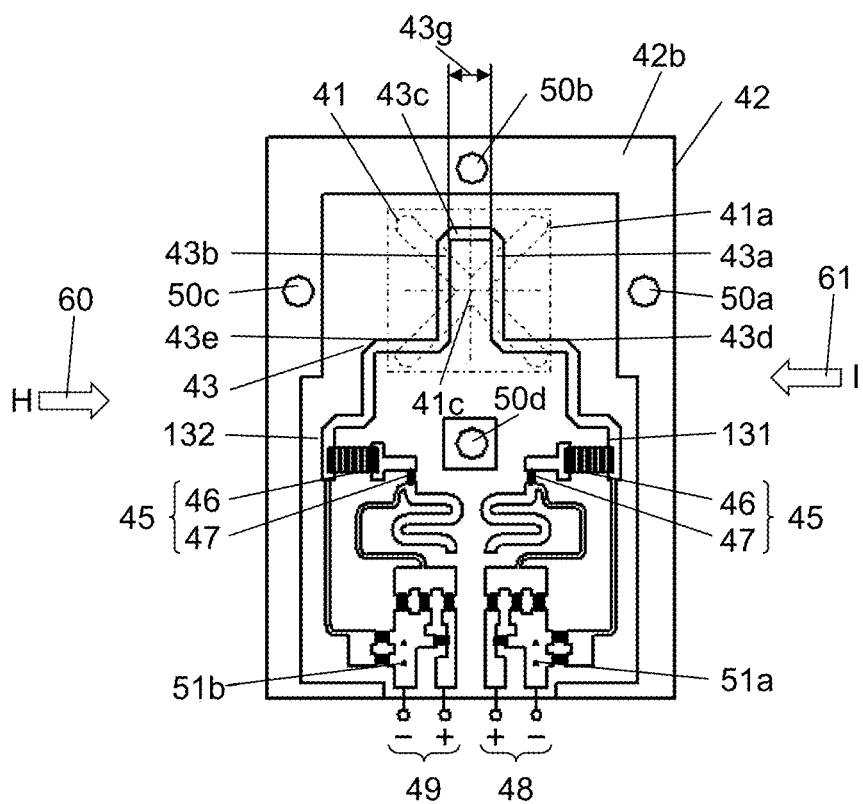
FIG. 12 illustrates a circuit configuration of the printed circuit board in the directional coupler in FIG. 9.

FIG. 9 is a perspective view of the directional coupler. FIG. 10 is a perspective view of the directional coupler in FIG. 9 in the case where its printed circuit board is illustrated in a transparent manner. FIG. 11 illustrates a configuration of a cross opening in the waveguide of the directional coupler in FIG. 9. FIG. 12 illustrates a circuit configuration of the printed circuit board in the directional coupler in FIG. 9.

As illustrated in FIGS. 9 to 12, directional coupler 30 includes: cross opening 41 having an X shape which is provided in wide surface 40a of waveguide 40; microstrip line 43 formed on printed circuit board 42; and support part 44. Printed circuit board 42 is provided on the exterior of waveguide 40 so as to face cross opening 41. Microstrip line 43, which has a predetermined line shape, is formed in a region of printed circuit board 42 which faces cross opening region 41a (see FIG. 11). When viewed in a direction from printed circuit board 42 to cross opening 41, cross opening region 41a is a region which is defined on a surface of printed circuit board 42 opposite cross opening 41 and in which an opening of cross opening 41 is present.

Support part 44 supports printed circuit board 42 and fixes printed circuit board 42 to the exterior of waveguide 40 on the wide surface 40a side. Support part 44, which is made of an insulating material, traps the microwave that would be radiated from cross opening 41 of waveguide 40, thereby shielding the microwave that would be radiated from waveguide 40 to the outside.

Cross opening 41 is an X-shaped opening, for example, that has central opening part 41c as its base point. As illustrated in FIG. 11, cross opening 41 is provided in wide surface 40a of waveguide 40 and is positioned so as not to intersect tube axis L1 of waveguide 40. Central opening part 41c of cross opening 41 is positioned away from tube axis L1 of waveguide 40 by a distance corresponding to dimension D1. For example, dimension D1 may be ¼ of the width of waveguide 40.

The opening shape of cross opening 41 depends on a width and height of wave guide 40, a power level and frequency band of the microwave propagating inside waveguide 40, a power level of the microwave radiated from cross opening 41, and other factors. For example, in a case where the width and height of waveguide 40 are 100 mm and 30 mm, respectively, a thickness of wall surfaces of wave guide 40 is 0.6 mm, the maximum power level and frequency band of the microwave propagating inside waveguide 40 are 1000 W and 2450 MHz, respectively, and the maximum power level of the microwave radiated from cross opening 41 is about 10 mW, cross opening 41 may be formed such that length 41w and width 41d are about 20 mm and 2 mm, respectively.

In FIG. 11, as an example, cross opening 41 has an X shape with its cross angle set to about 90 degrees; however, the present invention is not limited to this example. As an alternative example, the cross angle may be set to 60 degrees or 120 degrees.

If cross opening 41 is formed with central opening part 41c positioned on tube axis L1 of wave guide 40, an electric field generated by the microwave does not rotate but reciprocates in the propagating directions. In this case, a linearly polarized wave is radiated from cross opening 41.

If central opening part 41c is displaced from tube axis L1, the electric field rotates. However, as central opening part 41c is positioned closer to tube axis L1 (D1 is closer to 0 mm), the rotation of the electric field tends to be more misshapen. In this case, an elliptically polarized wave is radiated from cross opening 41.

In the present exemplary embodiment, dimension D1 is set to about ¼ of the width of waveguide 40. Setting dimension D1 in this manner enables the electric field to rotate in a substantially (subsuming completely) perfect circular fashion. As a result, the circularly polarized wave is radiated from cross opening 41 while rotating in a substantially perfectly circular fashion. In which case, the rotation direction of the electric field is definite Thus, it is possible to precisely separate the progressive and reflected waves propagating inside waveguide 40 from each other. Therefore, directional coupler 30 can detect the progressive and reflected waves precisely.

For example, a copper foil is bonded to entire A-sided printed circuit board 42a of printed circuit board 42 which does not face cross opening 41 to form a microwave reflecting member. This microwave reflecting member prevents the circularly polarized wave radiated from cross opening 41 from passing through printed circuit board 42.

B-sided printed circuit board 42b of printed circuit board 42 which faces cross opening 41 is provided with microstrip line 43 as illustrated in FIG. 12. Microstrip line 43 is, for example, a transmission line having a characteristic impedance of a substantially (subsuming just) 50 ohms. Microstrip line 43 is disposed so as to surround central opening part 41c of cross opening 41 when viewed in a direction from printed circuit board 42 to cross opening 41. In other words, central opening part 41c of cross opening 41 is surrounded by lines of microstrip line 43 when viewed in the above direction.

Microstrip line 43 includes first line 43a and second line 43b that are formed at least substantially (subsuming completely) vertically to tube axis L1 of waveguide 40. In planar view, both first line 43a and second line 43b face cross opening region 41a in which cross opening 41 is present and are disposed on both sides of central opening part 41c of cross opening 41.

First ends of first line 43a and second line 43b are connected to third line 43c formed substantially (subsuming completely) parallel to tube axis L1 of waveguide 40. First line 43a, second line 43b, and third line 43c are formed so as to surround central opening part 41c of cross opening 41. Second ends of first line 43a and second line 43b are connected to first ends of lines 43d and 43e formed substantially (subsuming completely) parallel to tube axis L1, and lines 43d and 43e extend to the outside of cross opening region 41a.

Lines that extend from second ends of lines 43d and 43e to output sections 131, 132 of microstrip line 43 are formed through microstrip line 43, in accordance with locations of output sections disposed. In this case, output sections 131, 132 are formed outside support part 44.

Output sections 131, 132 provided at both ends of microstrip line 43 are connected to detection circuits 45. Each detection circuit 45 includes a processing circuit that handles the level of a detected microwave as a control signal.

As illustrated in FIG. 12, each detection circuit 45 includes chip resistor 46 and Schottky diode 47. A microwave signal at output section 131 is rectified through corresponding detection circuit 45. The rectified microwave signal is converted into a direct-current (DC) voltage through a smoothing circuit that includes a chip resistor and a chip capacitor, for example. The converted DC voltage is output to detected wave output section 48. Likewise, a microwave signal at output section 132 is also converted into a DC voltage through a circuit similar to the above and output to detected wave output section 49.

Formed around printed circuit board mounting holes 50a, 50b, 50c, 50d and pinholes 51a, 51b in B-sided printed circuit board 42b facing cross opening 41 are copper foils to be used as ground planes. Each of regions formed by the copper foils has the same potential as A-sided printed circuit board 42a of printed circuit board 42 which does not face cross opening 41.

Printed circuit board 42 is assembled and fixed to support part 44 by passing screws 201a, 201b, 201c, and 201d into printed circuit board mounting holes 50a, 50b, 50c, and 50d. As illustrated in FIG. 10, flange surfaces 44a of support part 44 are provided with projecting screw parts 202a, 202b, 202c, 202d that assemble and fix screws 201a, 201b, 201c, and 201d.

Furthermore, as illustrated in FIG. 10, support part 44 is provided with extraction sections 141, 142. Extraction sections 141, 142 allow the microwave propagating along microstrip line 43 to be delivered to output sections 131, 132 disposed outside support part 44 and extracted from output sections 131, 132. Each of extraction sections 141, 142 is formed by drawing, for example, in a direction away from printed circuit board 42, corresponding one of flange surfaces 44a of support part 44 through which printed circuit board 42 is assembled on support part 44 by a screw. Forming extraction sections 141, 142 in this manner prevents support part 44 from affecting the propagation of the microwave along microstrip line 43.

FIGS. 9 and 10 illustrate connectors 48a, 49a mounted on detected wave output sections 48, 49 illustrated in FIG. 12.

In the above description, as an example, the directional coupler in FIGS. 9 to 12 detects the microwave propagating in two directions inside waveguide 40; however, the present invention is not limited to this configuration. As an alternative example, the directional coupler may detect the microwave propagating in only one of the directions inside waveguide 40. In this configuration, detection circuit 45 illustrated in FIG. 12 may be replaced with a termination circuit (not illustrated). This termination circuit may include a chip resistor having a resistance value of 50 ohms.

Next, a description will be given of an operation and effect of the directional coupler configured above.

A ratio of the power of the microwave radiated from cross opening 41 having an X shape to the power of the microwave propagating inside waveguide 40 depends on dimensional sizes of the waveguide and the cross opening. More specifically, in a case where the waveguide and the cross opening have the dimensional sizes described above, the power ratio becomes about 1/100,000 (about −50 dB). In FIGS. 9 to 12, arrow H denotes an incident wave (or progressive wave, referred to below as progressive wave 60) of a propagating microwave. Arrow I denotes a reflected wave (referred to below as reflected wave 61). In this case, as described above, when propagating inside waveguide 40 in the above manner, progressive wave 60 is sequentially excited by two openings that are formed in a direction of length 41w and constitute cross opening 41. Then, the microwave turns into a circularly polarized wave performing counterclockwise rotating radiation 62 (see FIG. 11) and is radiated to the outside of waveguide 40 via cross opening 41. Likewise, reflected wave 61 turns into a circularly polarized wave that is radiated while rotating clockwise and then is radiated to the outside of waveguide 40.

After rotationally radiated, the microwave of the circularly polarized waves is coupled to microstrip line 43 opposite cross opening 41. In this case, the microwave is radiated from cross opening 41 by progressive wave 60 propagating in the direction of arrow H is output to both output sections 131, 132 of microstrip line 43. However, most of the microwave directed by progressive wave 60 needs to be output to output section 131. Likewise, the microwave is radiated from cross opening 41 by reflected wave 61 propagating in the direction of arrow I is output to both output sections 131, 132 of microstrip line 43. However, most of the microwave directed by reflected wave 61 needs to be output to output section 132.

As can be understood from the above, a configuration of microstrip line 43 facing cross opening 41 is important in causing predetermined output sections to provide outputs in the propagating direction of the microwaves.

The inventors of the present application have diligently studied a relative position of microstrip line 43 that faces cross opening 41. As a result of the study, a configuration in which microstrip line 43 is formed so as to surround central opening part 41c of cross opening 41 when viewed in a direction from printed circuit board 42 to cross opening 41 can accomplish the achievement.

In the present exemplary embodiment, therefore, the configuration is made by microstrip line 43 surrounding central opening part 41c. More specifically, microstrip line 43 includes: first line 43a and second line 43b that are substantially (subsuming completely) vertical to tube axis L1 of wave guide 40; and third line 43c that is connected to the first ends of first line 43a and second line 43b and substantially (subsuming completely) parallel to tube axis L1 of waveguide 40. As illustrated in FIG. 12, each of first line 43a and second line 43b is formed so as to be long enough to face (traverse) the two openings making up cross opening 41 which are formed in the direction of length 41w. In addition, third line 43c is formed so as not to face the openings of cross opening 41.

As a result, microstrip line 43 configured above causes most of the microwave radiated from cross opening 41 by progressive wave 60 to be output to output section 131 of microstrip line 43. Also, microstrip line 43 causes most of the microwave radiated from cross opening 41 by reflected wave 61 to be output to output section 132 of microstrip line 43.

The method of causing the predetermined output sections to provide the most of the outputs also needs to be applied to an environment in which waveguide 40 is used to transmit progressive wave 60 and reflected wave 61 of the microwave propagate in directions opposite to each other. Therefore, the arrangement in which microstrip line 43 surrounds central opening part 41c of cross opening 41 needs to have symmetry. In the present exemplary embodiment, thus, first line 43a and second line 43b of microstrip line 43 are disposed a substantially (subsuming completely) equal distance away from central opening part 41c.

The above configuration can improve precision in which the directional coupler separately detects progressive wave 60 and reflected wave 61.

When progressive wave 60 and reflected wave 61 propagate in the opposite directions inside waveguide 40, a standing wave is generated inside waveguide 40. This standing wave might lower the precision of separately detecting progressive wave 60 and reflected wave 61.

To reduce an influence of the standing wave, the inventors of the present application have studied a distance 43g between first line 43a and second line 43b of microstrip line 43. The result will be described with reference to FIGS. 13 to 15.

Furthermore, the inventors of the present application have studied dimensional sizes of cross opening 41, microstrip line 43, waveguide 40, and other components, a frequency band of the microwave, and the detection power ratio of the directional coupler.

Figure 13:
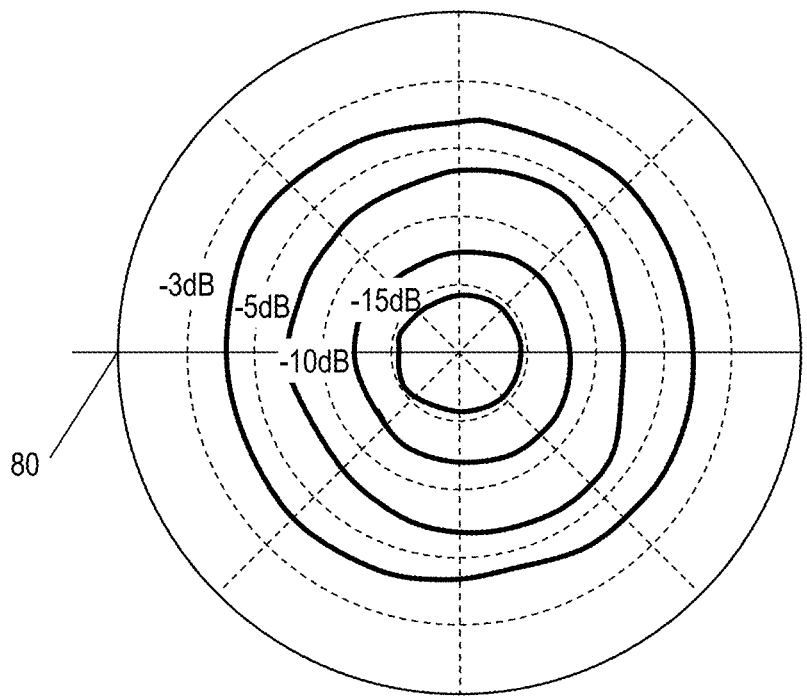
FIG. 13 is a polar coordinate diagram illustrating an output characteristic of a reflected wave detector in a directional coupler in FIG. 9.
Figure 14:
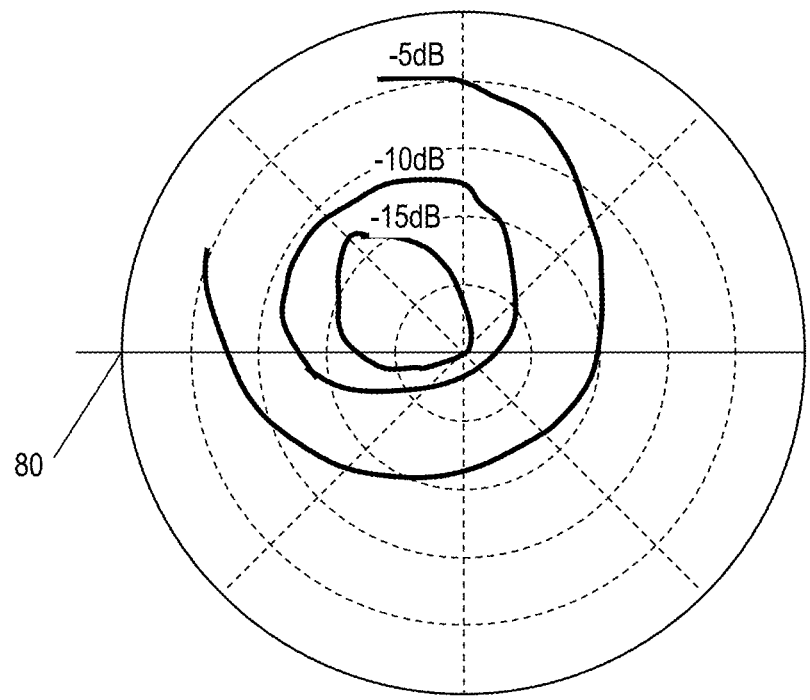
FIG. 14 is a polar coordinate diagram illustrating an output characteristic of a reflected wave detector in another configuration of the directional coupler in FIG. 9.
Figure 15:
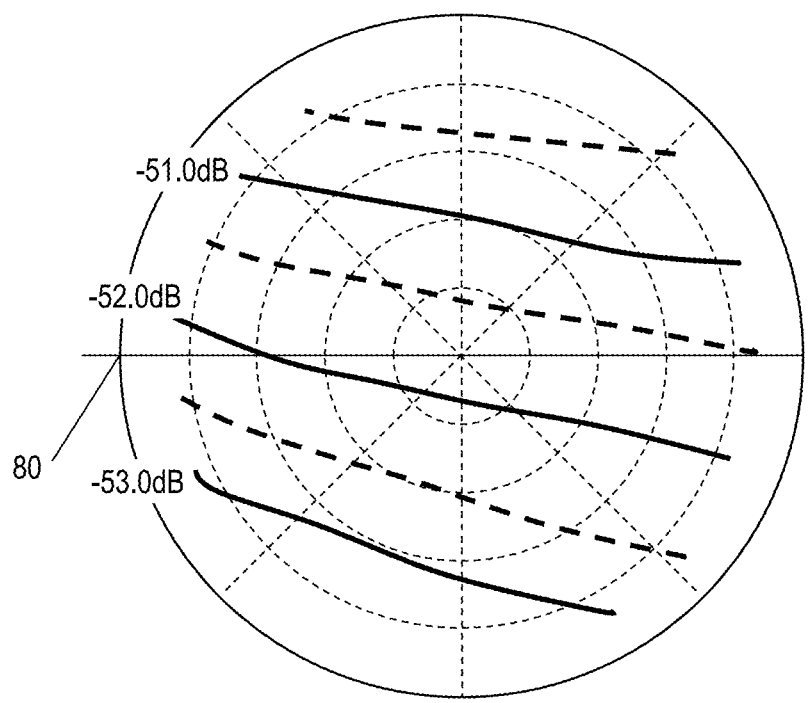
FIG. 15 is a polar coordinate diagram illustrating an output characteristic of a progressive wave detector in the directional coupler in FIG. 9.

FIG. 13 is a polar coordinate diagram illustrating an output characteristic of the reflected wave detector in directional coupler 30 when distance 43g between first line 43a and second line 43b is set to 4 mm. FIG. 14 is a polar coordinate diagram illustrating an output characteristic of the reflected wave detector in directional coupler 30 when distance 43g between first line 43a and second line 43b is set to 2 mm. FIG. 15 is a polar coordinate diagram illustrating an output characteristic of the progressive wave detector in directional coupler 30 under the condition of FIG. 13.

The polar coordinate diagrams of FIGS. 13 and 14 are obtained with the following configuration and under the following condition.

More specifically, as described above, the characteristic was evaluated using dimensions in which the width and height of waveguide 40 were 100 mm and 30 mm, respectively, the thickness of the wall surfaces was 0.6 mm, length 41w of cross opening 41 was 20 mm, and width 41d of cross opening 41 was 2 mm.

First, a first end of waveguide 40 configured above was connected to a microwave input terminal, whereas a second end of waveguide 40 was connected to a load with which the level and phase of reflected wave 61 were variable. Then, a microwave signal was supplied to waveguide 40 via the microwave input terminal connected to the first end of waveguide 40.

The level and phase of reflected wave 61 were varied by adjusting the load connected to the second end of waveguide 40, after which the powers of the microwave detected by output section 131 (progressive wave detection) and output section 132 (reflected wave detection) of microstrip line 43 were measured by a network analyzer. The power of the microwave (progressive wave) detected by output section 131 was denoted by S21. The power of the microwave (reflected wave) detected by output section 132 was denoted by S31.

Then, a difference (S31−S21) was calculated, and the resultant values were plotted on the polar coordinate display of the Smith chart. In this way, the polar coordinate diagrams of FIGS. 13 and 14 are obtained.

The polar diagrams of FIGS. 13 and 14 have reference plane 80 in which values at the input terminal of the load are displayed as reference, and totally reflects progressive wave 60 and causes the phase to vary by 180 degrees.

In the center of the polar coordinate display, power S31 of reflected wave 61 becomes zero. On an outer edge, namely, the circumference of the polar coordinate display, all progressive wave 60 turns into reflected wave 61. In short, power S31 of reflected wave 61 increases from the center toward the outer edge, namely, circumference of the polar coordinate display. In other words, the value (S31−S21) obtained by subtracting power S21 of progressive wave 60 from power S31 of reflected wave 61 decreases. It should be noted that the negative value decreases in FIGS. 13 and 14, because FIGS. 13 and 14 are expressed in decibels (dB).

A circumferential direction of the polar coordinate display is related to a phase and represents a phase of reflected wave 61 at a location where directional coupler 30 is disposed. In FIGS. 13 and 14, an input plane of the load is used as a reference plane, and thus the phase is displayed by relative values. On the same circumference of the polar coordinate display, reflected wave 61 differs in phase but the power (level) of reflected wave 61 is equal. When the values (S31−S21) obtained by subtracting power S21 of progressive wave 60 from power S31 of reflected wave 61 are plotted at polar coordinates, a contour made up of the values is ideally created in a concentric fashion.

Then, the inventors of the present application have analyzed the characteristics of FIGS. 13 and 14.

As illustrated in FIG. 13, the result obtained when distance 43g between first line 43a and second line 43b is set to 4 mm indicates a characteristic in which counter (thick) lines are formed substantially concentrically.

As illustrated in FIG. 14, the result obtained when distance 43g is set to 2 mm indicates a characteristic in which a counter (thick) lines are shifted from the center of the polar coordinate display.

The inventors of the present application have confirmed that the result obtained when distance 43g is set to 8 mm indicates a characteristic that is substantially the same as a result, not illustrated, obtained when distance 43g is set to 2 mm.

From the above relationship, the inventors of the present application have found that it is possible to reduce generation of a standing wave by setting distance 43g appropriately in accordance with sizes of waveguide 40, cross opening 41, and other components.

Hereinafter, the above phenomenon (in which it is possible to reduce generation of a standing wave by setting distance 43g appropriately) will be considered.

In general, it is known that a distance in which the waveguide 40 propagates from cross opening 41 while rotating forms an angle of about 50 degrees upward with a direction in which the microwave propagates inside waveguide 40. Therefore, it is expected that it is possible to reduce generation of a standing wave by disposing first line 43a and second line 43b at a site to which the rotating microwave is radiated at an angle of about 50 degrees.

In other words, it is expected that it is possible to reduce generation of a standing wave by optimizing distance 43g between first line 43a and second line 43b and a distance between wide surface 40a of waveguide 40 and B-sided printed circuit board 42b on which microstrip line 43 is formed.

Therefore, the inventors of the present application disposed both first line 43a and second line 43b opposite the opening of cross opening 41. In this case, the inventors of the present application set the distance between wide surface 40a of waveguide 40 and B-sided printed circuit board 42b on which microstrip line 43 is formed to an appropriate value, such as 5 mm to 7 mm and then studied a reduction in a standing wave. From the study, the inventors of the present application confirmed that it is possible to reduce generation of a standing wave.

Through the study, thus, the inventors of the present application have achieved compact directional coupler 30 that is mountable in waveguide 40.

With reference to FIG. 15, next, a description will be given of an output characteristic, related to a progressive wave, of directional coupler 30 whose shape and dimension are set to the above values.

FIG. 15 is a polar coordinate diagram illustrating an output characteristic of the progressive wave detector in the directional coupler in FIG. 9. In FIG. 15, power S21 of the microwave (corresponding to the progressive wave) detected by output section 131 of directional coupler 30 is displayed at polar coordinates.

As illustrated in FIG. 15, a detection value of the progressive wave which reflects a variation in a load fluctuates in a range from −50.5 dB to −53.0 dB within the polar coordinate region.

As the fluctuation range becomes narrower, corresponding detection circuit 45 can process the signal more easily. If the fluctuation occurs to the extent described above, a low-cost component can be used as Schottky diode 47 in each detection circuit 45. Even if low-cost components are used, each detection circuit 45 can process the signal easily.

It should be noted that the region surrounded by first line 43a, second line 43b, and third line 43c has not been described above but is preferably set to be smaller than cross opening region 41a. As illustrated in FIG. 12, each of first line 43a and second line 43b is preferably positioned in a substantially center between central opening part 41c and an edge (right or left edge in FIG. 12) of cross opening region 41a. Moreover, third line 43c is more preferably positioned in a substantially center between central opening part 41c and an edge (upper edge denoted by an alternate long and short dash line in FIG. 12) of cross opening region 41a. This configuration can precisely detect the progressive and reflected waves that have been supplied to the directional coupler.

In the above description, as an example, an opening shape of cross opening 41 is an X shape in which two long holes intersect each other; however, the present invention is not limited to this example. As an alternative example, the opening shape of cross opening 41 may be any shape in which two or more long holes are inclined at different angles with respect to tube axis L1 of waveguide 40. The opening shape of cross opening 41 may be any shape in which two or more long holes intersect one another with their intersecting portions shifted from the centers. Furthermore, the opening shape of cross opening 41 may be, for example, an L or T shape. The opening shape of cross opening 41 may include a combination of two or more long holes. The inventors of the present application have confirmed that the electric field can rotate to radiate a circularly polarized wave even when the intersecting angle of cross opening 41 having an X shape is varied by about 30 degrees from the right angle. However, the formation in which two long holes are disposed in X form so as to be orthogonal to each other at their center, as in the present exemplary embodiment, is more preferable, because this formation enables a circularly polarized wave having a substantially perfect circular shape to be radiated.

Alternatively, the opening shape of cross opening 41 may be circular or polygonal. In short, as described above, the opening shape may be any shape in which two or more long holes are inclined at different angles with respect to tube axis L1 of waveguide 40. Therefore, the opening shape may be a circular shape formed with many long holes disposed with their angles slightly differing from one another or may be a square shape formed with a line connecting the four peaks of an X-shaped, long holes. The opening shape may be an elliptical, rectangular, or trapezoidal shape formed by pressing a circular or square shape. The opening shape may be a polygonal shape other than a rectangular shape or a tortuous shape, such as a heart or star shape. However, a circular shape and a rectangular shape are less likely to be deformed than tortuous shapes, such as an X shape, and thus more effective.

As described above, a microwave heating apparatus of the present invention includes: a heating chamber that accommodates an object to be heated; a microwave generator that generates a microwave to be supplied to the heating chamber; and a waveguide through which the microwave generated by the microwave generator propagates to the heating chamber. Furthermore, the microwave heating apparatus includes: a reflected wave detector that detects at least part of a reflected wave inside the waveguide; a quantity determiner that determines a quantity of the object from a reflected wave detection amount that is an amount of the at least part of the reflected wave detected by the reflected wave detector; and a controller that controls the microwave generator based on the quantity determined by the quantity determiner.

According to this configuration, the microwave heating apparatus is provided with the reflected wave detector that detects the at least part of the reflected wave inside the waveguide. When the object is absent, a reflected wave is strong, because there is nothing to absorb the microwave. When the object is present, the reflected wave is weak, because the microwave is absorbed by the object. As the quantity of the object becomes greater, a larger amount of microwave is absorbed by the object, and thus the reflected wave is weakened. In short, the quantity determiner can detect a load, based on the reflected wave detection amount detected by the reflected wave detector. This enables the microwave heating apparatus to determine the quantity of the object without using a detector. Consequently, it is possible to heat the object efficiently, based on the determined quantity.

The quantity determiner in the microwave heating apparatus of the present invention may determine the quantity of the object by comparing the reflected wave detection amount detected by the reflected wave detector during heating with the reflected wave detection amount detected by the reflected wave detector when the object is absent. In this way, the quantity determiner uses, as a reference amount, the reflected wave detection amount obtained when the object is absent and then determines the quantity of the object precisely based on a difference between the reference amount and the reflected wave detection amount obtained during the heating.

The microwave heating apparatus of the present invention further includes: a radiation antenna that radiates the microwave propagating inside the waveguide to the heating chamber; and a rotary driver that rotates the radiation antenna. The controller controls an output of the microwave generator based on the quantity determined by the quantity determiner, and controls a direction in which the radiation antenna faces by controlling driving of the rotary driver. In this case, the quantity determiner may compare the reflected wave detection amount detected by the reflected wave detector during the heating with the reflected wave detection amount detected by the reflected wave detector when the object is absent, and may determine the quantity of the object when the radiation antenna faces in a direction in which a difference between the compared reflected wave detection amounts is maximized. By maximizing the difference in reflected wave detection amount in this manner, a resolution at which the quantity of the object is determined can be improved. Consequently, it is possible to determine the quantity of the object precisely, thereby heating the object appropriately.

The quantity determiner in the microwave heating apparatus of the present invention compares the reflected wave detection amount detected by the reflected wave detector during the heating with the reflected wave detection amount detected by the reflected wave detector when the object is absent. Then, the quantity determiner may determine in which direction the radiation antenna faces when a difference between the compared reflected wave detection amounts is maximized, and may further determine the quantity of the object, based on a difference between the reflected wave detection amounts when the radiation antenna faces in the determined direction and when the radiation antenna faces in a different direction. This makes it possible to absorb variations in reflected wave detection amounts in microwave heating apparatuses which may be attributed to individual characteristic differences, thereby determining the quantity of the object more precisely.

The microwave heating apparatus of the present invention further includes a mounting plate that latches onto an interior of the heating chamber so as to vertically divide the heating chamber. The object is placed on the mounting plate. A microwave absorbing heat generator is mounted on a rear surface of the mounting plate. The mounting plate has an outer corner part that has a curved shape larger than a corresponding inner wall corner of the heating chamber. A gap is formed between the outer corner part and the inner wall corner. The controller may control the radiation antenna so as to face in a direction toward the gap. The quantity determiner may determine the quantity of the object based on a reflected wave detection amount obtained when the radiation antenna faces in the direction.

The configuration in which the radiation antenna faces in the direction toward the gap causes the microwave radiated from the radiation antenna to pass through the gap and propagate above the mounting plate more easily than a configuration in which the radiation antenna faces in any other direction. In this case, a larger proportion of microwave strikes the object, and the reflected wave detection amount thereby varies more greatly depending on the quantity of the object. Consequently, it is possible to determine the quantity of the object precisely.

The quantity determiner in the microwave heating apparatus of the present invention compares the reflected wave detection amount detected by the reflected wave detector during the heating of the object, the reflected wave detection amount detected by the reflected wave detector when the object is absent, and a reflected wave detection amount detected by the reflected wave detector when the object is in a predetermined maximum quantity. Based on the comparison result, the quantity determiner may determine the quantity of the object.

In this way, it is possible to determine whether of the reflected wave detection amounts obtained when the object is absent and when the object is in the maximum quantity is closer to the reflected wave detection amount obtained during the heating of object 21. Consequently, this configuration can determine the quantity of the object more precisely than a configuration in which the reflected wave detection amount obtained during the heating of the object is compared to the reflected wave detection amount obtained when the object is absent.

INDUSTRIAL APPLICABILITY

A microwave heating apparatus according to the present invention is applicable to heating cookers that dielectrically heat an object, such as a food, by radiating a microwave to the object. More specifically, the microwave heating apparatus is effectively applicable to ovens, grills and heating cookers that use a microwave and other heating means, such as heating steam, in combination. Moreover, the microwave heating apparatus according to the present invention is effectively applicable to drying apparatuses, pottery heating apparatuses, garbage disposers, and other industrial apparatuses, including semiconductor manufacturing apparatuses and chemical reactors.

REFERENCE MARKS IN THE DRAWINGS

1: microwave oven (microwave heating apparatus)
2: heating chamber space
2a: heating chamber
2b: power feeding chamber
2bb, 14a, 14b: opening
2c, 2d: side wall
2g: inner wall corner
2h: projection
3: magnetron (microwave generator)
3a: output end
4, 40: waveguide
5: radiation antenna (waveguide-structured antenna)
6: mounting table
7: coupling part
7a: coupling shaft
7b: flange
8: waveguide structure
11: bottom surface
13: open end
15: motor (rotary driver)
16: infrared sensor
17: controller
20: grill plate (mounting plate)
18a, 18b: projection
20a: periphery
20b: groove
20c: plate
20d: insulating part
20e: microwave absorbing heat generator
20g: outer corner part
20f: bottom surface
21: object to be heated
22a, 22b, 22c, 22d: corner
30: directional coupler (reflected wave detector)
31: quantity determiner
32, 33: gap
40a: wide surface
41: cross opening
41a: cross opening region
41c: central opening part
41d: width
41w: length
42: printed circuit board
42a: A-sided printed circuit board
42b: B-sided printed circuit board
43: microstrip line
43a: first line
43b: second line
43c: third line
43d, 43e: line 43g: distance
44: support part
44a: flange surface
45: detection circuit
46: chip resistor
47: Schottky diode
48, 49: detected wave output section
48a, 49a: connector
50a, 50b, 50c, 50d: printed circuit board mounting hole
51a, 51b: pinhole
60: incident wave (progressive wave)
61: reflected wave
62: rotating radiation
80: reference plane
131, 132: output section
141, 142: extraction section
201a, 201b, 201c, 201d: screw
202a, 202b, 202c, 202d: projecting screw part
D1: dimension
E, F, H, I: arrow
G: center of rotation
J: central line
L1: tube axis

The invention claimed is:

1. A microwave heating apparatus comprising:
a heating chamber that accommodates an object to be heated;
a microwave generator that generates a microwave to be supplied to the heating chamber;
a waveguide through which the microwave generated by the microwave generator propagates to the heating chamber;
a reflected wave detector that detects at least part of a reflected wave inside the waveguide;
a quantity determiner that determines a quantity of the object, from a reflected wave detection amount that is an amount of the at least part of the reflected wave detected by the reflected wave detector; and
a controller that controls the microwave generator, based on the quantity determined by the quantity determiner,
wherein the quantity determiner determines the quantity of the object by comparing a reflected wave detection amount detected by the reflected wave detector during heating with a reflected wave detection amount detected by the reflected wave detector when the object is absent.

2. The microwave heating apparatus according to claim 1, further comprising: a radiation antenna that radiates the microwave propagating inside the waveguide to the heating chamber; and a rotary driver that rotates the radiation antenna, wherein
the controller controls an output of the microwave generator based on the quantity determined by the quantity determiner, and controls a direction in which the radiation antenna faces by controlling driving of the rotary driver, and
the quantity determiner compares the reflected wave detection amount detected by the reflected wave detector during the heating with the reflected wave detection amount detected by the reflected wave detector when the object is absent, and determines the quantity of the object when the radiation antenna faces in a direction in which a difference between the compared reflected wave detection amounts is maximized.

3. The microwave heating apparatus according to claim 2, wherein the quantity determiner compares the reflected wave detection amount detected by the reflected wave detector during the heating with the reflected wave detection amount detected by the reflected wave detector when the object is absent, determines in which direction the antenna faces when a difference between the compared reflected wave detection amounts is maximized, and further determines the quantity of the object, based on a difference between the reflected wave detection amounts obtained when the antenna faces in the determined direction and when the antenna faces in a different direction.

4. The microwave heating apparatus according to claim 2, further comprising a mounting plate that latches onto an interior of the heating chamber so as to vertically divide the heating chamber, the object being placed on the mounting plate, a microwave absorbing heat generator being mounted on a rear surface of the mounting plate, the microwave absorbing heat generator absorbing the microwave,
the mounting plate having an outer corner part that has a curved shape larger than a corresponding inner wall corner of the heating chamber, a gap being formed between the outer corner part and the corresponding inner wall corner,
the controller controlling the radiation antenna so as to face in a direction toward the gap,
the quantity determiner determining the quantity of the object, based on a reflected wave detection amount obtained when the radiation antenna faces in the direction.

5. The microwave heating apparatus according to claim 1, wherein the quantity determiner compares the reflected wave detection amount detected by the reflected wave detector during the heating of the object, the reflected wave detection amount detected by the reflected wave detector when the object is absent, and a reflected wave detection amount detected by the reflected wave detector when the object is in a predetermined maximum quantity, and determines the quantity of the object based on a comparison result.

* * * * *